United States Patent
Kuge et al.

(10) Patent No.: US 11,178,711 B2
(45) Date of Patent: Nov. 16, 2021

(54) USER EQUIPMENT, CORE NETWORK DEVICE, AND COMMUNICATION CONTROL METHOD THEREOF PERFORMING COMMUNICATIONS USING NETWORK SLICE SELECTION ASSISTANCE INFORMATION

(71) Applicants: SHARP KABUSHIKI KAISHA, Sakai (JP); FG Innovation Company Limited, Tuen Mun (HK)

(72) Inventors: Yoko Kuge, Sakai (JP); Yudai Kawasaki, Sakai (JP); Masafumi Aramoto, Sakai (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 8 days.

(21) Appl. No.: 16/346,365

(22) PCT Filed: Nov. 6, 2017

(86) PCT No.: PCT/JP2017/039967
§ 371 (c)(1),
(2) Date: Apr. 30, 2019

(87) PCT Pub. No.: WO2018/084290
PCT Pub. Date: May 11, 2018

(65) Prior Publication Data
US 2019/0274177 A1 Sep. 5, 2019

(30) Foreign Application Priority Data
Nov. 7, 2016 (JP) .............................. JP2016-216997

(51) Int. Cl.
*H04W 76/15* (2018.01)
*H04W 60/04* (2009.01)
(Continued)

(52) U.S. Cl.
CPC ........... *H04W 76/15* (2018.02); *H04W 48/02* (2013.01); *H04W 48/12* (2013.01); *H04W 48/14* (2013.01);
(Continued)

(58) Field of Classification Search
CPC ..... H04W 76/11; H04W 76/15; H04W 48/02; H04W 48/12; H04W 48/14; H04W 48/16; H04W 48/18; H04W 60/04
See application file for complete search history.

(56) References Cited

U.S. PATENT DOCUMENTS

2015/0334766 A1 11/2015 Lee et al.
2017/0339609 A1* 11/2017 Youn .................... H04W 76/11
(Continued)

FOREIGN PATENT DOCUMENTS

JP 2016-506704 A 3/2016

OTHER PUBLICATIONS

3rd Generation Partnership Project; Technical Specification Group Services and System Aspects; Study on Architecture for Next Generation System, (Release 14), 3GPP TR 23.799 V1.1.0 (Oct. 2016).
(Continued)

*Primary Examiner* — Jenee Holland
(74) *Attorney, Agent, or Firm* — ScienBiziP, P.C.

(57) ABSTRACT

Provided is a communication control method for optimally managing control information of a terminal apparatus capable of connecting to various kinds of core networks, a device communication controller for a network capable of connecting to the terminal apparatus, a configurator for configuring control information relating to communication of each device, a communication controller for updating configuration information relating to communication stored by each device, and the like, in the terminal apparatus and
(Continued)

the network. This provides a communication controller suitable for a communication system and a terminal apparatus that support configurations of various kinds of core networks.

14 Claims, 17 Drawing Sheets

(51) Int. Cl.
*H04W 76/11* (2018.01)
*H04W 48/02* (2009.01)
*H04W 48/12* (2009.01)
*H04W 48/14* (2009.01)
*H04W 48/16* (2009.01)
*H04W 48/18* (2009.01)

(52) U.S. Cl.
CPC ........... *H04W 48/16* (2013.01); *H04W 48/18* (2013.01); *H04W 60/04* (2013.01); *H04W 76/11* (2018.02)

(56) References Cited

U.S. PATENT DOCUMENTS

| | | | | |
|---|---|---|---|---|
| 2017/0359768 | A1* | 12/2017 | Byun | H04W 8/06 |
| 2018/0317163 | A1* | 11/2018 | Lee | H04W 48/18 |
| 2019/0158360 | A1* | 5/2019 | Xu | H04W 36/08 |
| 2019/0223093 | A1* | 7/2019 | Watfa | H04W 48/18 |
| 2019/0364541 | A1* | 11/2019 | Ryu | H04W 72/02 |
| 2019/0380104 | A1* | 12/2019 | Vrzic | H04W 76/12 |
| 2020/0059989 | A1* | 2/2020 | Velev | H04W 36/12 |

OTHER PUBLICATIONS

ZTE&Huawei, Convenor summary of email discussion about "NS selection assistance information from the UE/Network", S2-165377, SA WG2 Meeting #116BIS, Aug. 29-Sep. 2, 2016, Sanya, China.
ETRI, KDDI, KPN, Nokia, Oracle, Samsung, ZTE., "Network Slicing Solution #2 Update", S2-1645129, SA WG2 Meeting #116BIS, Aug. 29-Sep. 2, 2016, Sanya, China.

* cited by examiner

FIG. 5B

| IMSI |
| --- |
| EMM State |
| GUTI |
| ME Identity |

FIG. 5C

| APN in Use |
| --- |
| Assigned Session Type |
| IP Address(es) |
| Default Bearer |

FIG. 5D

| EPS Bearer ID |
| --- |
| TI |
| TFT |

| |
|---|
| IMSI |
| MSISDN |
| MM State |
| GUTI |
| ME Identity |
| UE Radio Access Capability |
| UE Network Capability |
| MS Network Capability |
| Access Restriction |
| MME F-TEID |
| SGW F-TEID |
| eNB Address |
| MME UE S1AP ID |
| eNB UE S1AP ID |
| NR node Address |
| NR node ID |
| WAG Address |
| WAG ID |

| APN in Use |
|---|
| Assigned Session Type |
| IP Address(es) |
| PGW F-TEID |
| SCEF ID |
| Default bearer |

FIG. 9D

| EPS Bearer ID |
|---|
| TI |
| TFT |
| SGW F-TEID |
| PGW F-TEID |
| MME F-TEID |
| eNB address |
| NR node address |
| WAG address |
| eNB ID |
| NR node ID |
| WAG ID |

FIG. 11B

| IMSI |
| --- |
| ME Identity |
| MSISDN |
| MME F-TIED |
| SGW F-TIED |

FIG. 11C

| APN in Use (Data Network Identifier) |
| --- |
| Assigned Session Type (Assigned PDN Type) |
| SGW F-TEID |
| PGW F-TEID |
| Default Bearer |
| IP Address(es) |

FIG. 11D

| EPS Bearer ID |
| --- |
| TFT |
| PGW F-TEID |
| SGW F-TEID |
| eNB F-TEID |
| MME address |
| NR node address |
| WAG address |
| MME ID |
| NR node ID |
| WAG ID |

FIG. 12B

| IMSI |
|---|
| ME Identity |
| MSISDN |
| RAT type |

FIG. 12C

| APN in Use |
|---|

FIG. 12D

| Assigned Session Type |
|---|
| IP Address(es) |
| SGW F-TEID |
| PGW F-TEID |
| Default Bearer |

FIG. 12E

| EPS Bearer ID |
|---|
| TFT |
| SGW F-TEID |
| PGW F-TEID |

| User Identity |
|---|
| APN in Use |
| EPS Bearer ID |
| Serving Node Information |

FIG. 13B

USER EQUIPMENT, CORE NETWORK DEVICE, AND COMMUNICATION CONTROL METHOD THEREOF PERFORMING COMMUNICATIONS USING NETWORK SLICE SELECTION ASSISTANCE INFORMATION

TECHNICAL FIELD

The present invention relates to a terminal apparatus, a core network apparatus, a communication system, and a communication control method. This application claims priority based on JP 2016-216997 filed on Nov. 7, 2016 in Japan, the contents of which are incorporated herein in its entirety by reference.

BACKGROUND ART

The 3rd Generation Partnership Project (3GPP), which undertakes activities for standardizing recent mobile communication systems, discusses System Architecture Evolution (SAE), which is system architecture of the Long Term Evolution (LTE). 3GPP is in the process of creating specifications for the Evolved Packet System (EPS) as a communication system that realizes an all Internet Protocol (IP) architecture. Note that a core network constituting EPS is called an Evolved Packet Core (EPC).

3GPP recently also discusses next generation communication technologies and system architectures for the 5th Generation (5G) mobile communication system, which is a next generation mobile communication system, and discusses, as a next generation communication technology, Architecture and Security for Next Generation System (NextGen). In NextGen, technical problems relating to connection of various terminals to a cellular network are extracted, and solutions are in the process of being created as specifications.

Examples of requirements include optimization and diversification of a communication procedure for supporting a continuous mobile communication service for each terminal supporting various access networks, optimization of a system architecture according to optimization and diversification of a communication procedure.

CITATION LIST

Non Patent Literature

NPL 1: 3GPP TR 23.799; Technical Specification Group Services and System Aspects; Study on Architecture for Next Generation System; (Release 14)

SUMMARY OF INVENTION

Technical Problem

In NextGen, discussions are taking place regarding selection, by an access network, of an appropriate Common Control Plane Network Function (CPNF) (CCNF) by using parameter information, such as Temp ID, acquired by a UE from the network at the time of an attach procedure, in a procedure after the attach procedure.

Moreover, in NextGen, discussions are taking place regarding UE changing to a state of not receiving paging from a network in Mobile Originated only (MO only) mode.

However, no means for managing such parameter information and a mode, establishing a session using such a parameter, and realizing a communication means using such a mode, and the like have been made clear.

The present invention has been made in view of the above-described situation, and an object is to provide a communication control means for realizing management of configurations relating to communication, and the like.

Solution to Problem

A terminal apparatus according to an embodiment of the present invention includes: a transmission unit configured to transmit an attach request message including first identification information to a core network apparatus; a reception unit configured to receive, from the core network apparatus, an attach accept message including second identification information and a first timer value, as a response to the attach request message; and a control unit configured to configure the first timer value in a first timer, based on reception of the second identification information and/or the first timer value, and start the first timer. The first identification information is information, stored for each Public Land Mobile Network (PLMN), for identifying a network slice type and/or a service type. The second identification information is used by an access network device to select a routing destination of a message received from the terminal apparatus. The first timer is a timer used by the terminal apparatus to manage expiry of the second identification information. The first timer value is a value assigned to the terminal apparatus by the core network.

A core network apparatus according to an embodiment of the present invention includes: a mobility management device configured to receive an attach request message including first identification information from a terminal apparatus; assign second identification information and a first timer, to the terminal apparatus, and transmit, to the terminal apparatus, an attach accept message including the second identification information and a first timer value, as a response to the attach request message, the mobility management device being shared by multiple network slices; and a gateway device as a gateway to an external network. The first timer value is used by the terminal apparatus to start the first timer. The first identification information is information, stored for each Public Land Mobile Network (PLMN), for identifying a network slice type and/or a service type. The second identification information is used by an access network device to select a routing destination of a message received from the terminal apparatus. The first timer is a timer used by the terminal apparatus to manage expiry of the second identification information.

A communication system according to an embodiment of the present invention includes: a mobility management device and/or a gateway device, the mobility management device being configured to receive an attach request message including first identification information from a terminal apparatus, assign second identification information and a first timer, to the terminal apparatus, transmit, to the terminal apparatus, an attach accept message including the second identification information and a first timer value, as a response to the attach request message, receive a tracking area update request message including the first identification information from the terminal apparatus, transmit, to the terminal apparatus, a tracking area update accept message including the second identification information and the first timer value for the first timer, as a response to the tracking area update request message, and transmit a configuration update request message including third identification information and/or a second timer value, to the terminal apparatus. The first timer value is used by the terminal apparatus to start the first timer. The first identification information is information, stored for each Public Land Mobile Network (PLMN), for identifying a network slice type and/or a service type. The second identification information is used by an access network device to select a routing destination of a message received from the terminal apparatus. The first timer is a timer used by the terminal apparatus to manage expiry of the second identification information. The second timer value is used by the terminal apparatus to start the first timer. The third identification information is used by the terminal apparatus to update the second identification information to the third identification information. The second timer value is used by the terminal apparatus to stop and restart the first timer.

A communication control method of a terminal apparatus according to an embodiment of the present invention includes the steps of: transmitting an attach request message including first identification information to a core network apparatus; receiving, from the core network apparatus, an attach accept message including second identification information and a first timer value, as a response to the attach request message; and configuring the first timer value in a first timer, based on reception of the second identification information and/or the first timer value, and starting the first timer. The first identification information is information, stored for each Public Land Mobile Network (PLMN), for identifying a network slice type and/or a service type. The second identification information is used by an access network device to select a routing destination of a message received from the terminal apparatus. The first timer is a timer used by the terminal apparatus to manage expiry of the second identification information. The first timer value is a value assigned to the terminal apparatus by the core network.

A communication control method of a core network apparatus according to an embodiment of the present invention includes the steps of: receiving an attach request message including first identification information from a terminal apparatus; assigning second identification information and a first timer, to the terminal apparatus; and transmitting, to the terminal apparatus, an attach accept message including the second identification information and a first timer value, as a response to the attach request message. The first timer value is used by the terminal apparatus to start the first timer. The first identification information is information, stored for each Public Land Mobile Network (PLMN), for identifying a network slice type and/or a service type. The second identification information is used by an access network device to select a routing destination of a message received from the terminal apparatus. The first timer is a timer used by the terminal apparatus to manage expiry of the second identification information.

Advantageous Effects of Invention

According to the present invention, the terminal apparatus and each of the devices in the core network are capable of managing identifiers and/or parameters necessary for communication. In addition, each of the devices are capable of performing communication control, based on a configured identifier and/or parameter.

BRIEF DESCRIPTION OF DRAWINGS

FIGS. 5B to 5D are diagrams illustrating a storage unit of the UE.

FIG. 8B is a diagram illustrating a storage unit of the MME/CPF.

FIGS. 9C and 9D are diagrams illustrating the storage unit of the MME/CPF.

FIGS. 11B to 11D are diagrams illustrating a storage unit of the SGW.

FIGS. 12B to 12E are diagrams illustrating a storage unit of the PGW/UPGW.

FIG. 13B is a diagram illustrating a storage unit of the SCEF.

DESCRIPTION OF EMBODIMENTS

Hereinafter, embodiments for carrying out the present invention will be described with reference to the drawings. Note that as an example, a present embodiment describes an embodiment of a mobile communication system to which the present invention is applied.

1. Embodiment 1.1 System Overview

Figure 1:
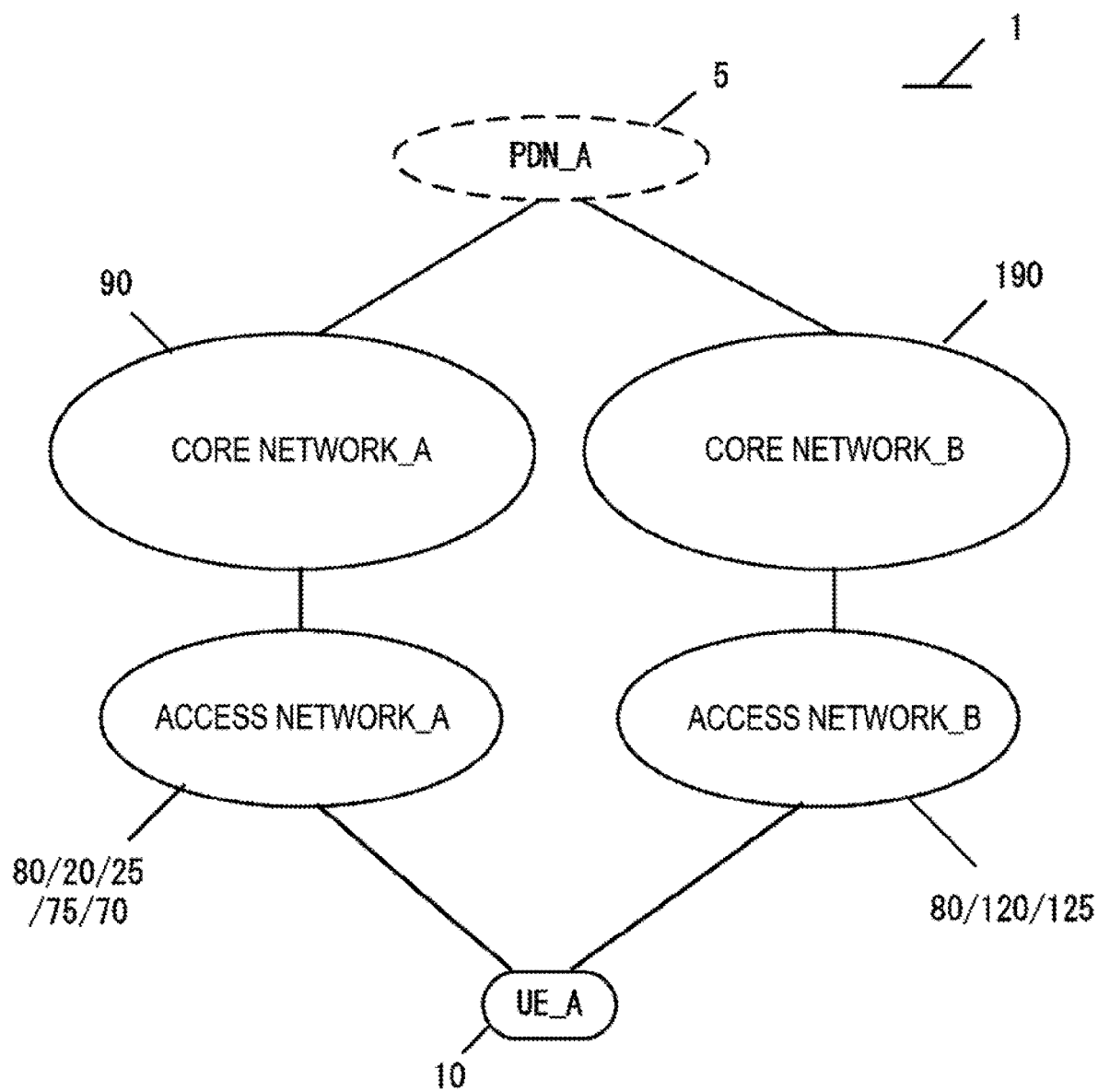
FIG. 1 is a diagram illustrating an overview of a mobile communication system.

FIG. 1 is a diagram illustrating an overview of a mobile communication system according to the present embodiment. As illustrated in the drawing, a mobile communication system 1 is constituted of a mobile terminal apparatus UE_A 10, an access network_B, a core network_B 190, and a Packet Data Network (PDN)_A 5. Here, the UE_A 10 may be any wirelessly connectable terminal apparatus, and may be a User Equipment (UE), a Mobile Equipment (ME), a Mobile Station (MS), a Cellular Internet of Things (IoT) terminal (CIoT UE), or the like. The core network may be the core network_B 190, and the access network may be the access network_B. The core network may be a core network apparatus. Alternatively, in the present embodiment, the core network apparatus may be each of devices included in the core network_B 190 and/or an apparatus configured to perform part of or all processes or functions of each of the devices. The access network_B may be a NextGen RAN_AA 120 and/or an E-UTRAN_A 80 and/or a WLAN ANc 125.

Moreover, the UE_A 10 is capable of connecting to the access network and/or the core network. The UE_A 10 is further capable of connecting to the PDN_A 5 via the access network and/or the core network and transmits and/or receives user data to and/or from the PDN_A 5. Note that user data here may be data transmitted and/or received between the UE_A 10 and the PDN_A 5. User data transmission and/or reception (communication) may be performed through a Protocol Data Unit or Packet Data Unit (PDU) session or may be performed through a Packet Data Network (PDN) Connection. The user data communication is not limited to Internet Protocol (IP) communication and may be non-IP communication.

Here, the PDU session or the PDN connection (hereinafter, also referred to as PDN connectivity) is connectivity established between the UE_A 10 and the PDN_A 5 to provide a PDU connection service for performing user data transmission and/or reception between the UE_A 10 and the PDN_A 5, and the like. More specifically, the PDU session or the PDN connection may be connectivity established between the UE_A 10 and an external gateway. Here, the external gateway may be a device configured to connect the core network such as a Packet Data Network Gateway (PGW)_A 30, a User Plane Gateway (UPGW)_A 130, or a Service Capability Exposure Function (SCEF)_A 46, and the PDN_A 5.

The PDU session or the PDN connection may be a communication path established to transmit and/or receive user data or may be a communication path to transmit and/or receive a PDU, between the UE_A 10 and the core network and/or the PDN_A 5. The PDU session or the PDN connection may be a session established between the UE_A 10 and the core network and/or the PDN_A 5 or may be a logical communication path constituted of transfer paths, such as one or multiple bearers, between the devices in the mobile communication system 1. More specifically, the PDU session may be a connection established by the UE_A 10 between the core network_B 190 and the external gateway, a connection established between the UE_A 10 and the UPGW_A 130, a connection such as a Packet Data Network Connection (PDN connection), or the like.

Note that the PDN connection may be connectivity and/or a connection between the UE_A 10 and the PGW_A 30 via an evolved Node B (eNB)_A 45 and/or a Serving Gateway (SGW)_A 35 or connectivity and/or a connection between the UE_A 10 and the SCEF_A 46 via the eNB_A 45 and/or a Mobility Management Entity (MME)_A 40. The PDU session may be connectivity and/or a connection between the UE_A 10 and the UPGW_A 130 via an NR node_A 122.

Note that the UE_A 10 is capable of transmitting and/or receiving user data to and/or from a device, such as an application server, located in the PDN_A 5, through a PDU session or a PDN connection. In other words, a PDU session or a PDN connection is capable of transferring user data transmitted and/or received between the UE_A 10 and the device, such as the application server, located in the PDN_A 5. Each of the devices (the UE_A 10, the devices in the access network, and/or the devices in the core network) may manage one or multiple kinds of identification information in association with a PDU session or a PDN connection. Note that the pieces of identification information may include at least one of an Access Point Name (APN), a Traffic Flow Template (TFT), a session type, application identification information, identification information of the PDN_A 5, Network Slice instance (NSI) identification information, Dedicated Core Network (DCN) identification information, and access network identification information, and may further include another kind(s) of information. In a case of establishing multiple PDU sessions or PDN connections, pieces of identification information associated with the respective PDU sessions or PDN connections may indicate the same or different contents. The NSI identification information is information identifying an NSI and may be referred to as an NSI ID or Slice Instance ID below.

The IP communication refers to data communication using IP and refers to data communication achieved by transmission and/or reception of an IP packet to which an IP header is attached. Note that payload constituting an IP packet may include user data transmitted and/or received from and/or by the UE_A 10. The non-IP communication refers to data communication not using IP and refers to data communication achieved by transmission and/or reception of data to which no IP header is attached. For example, the non-IP communication may be data communication achieved by transmission and/or reception of application data to which no IP packet is attached and may transmit and/or receive user data transmitted and/or received by the UE_A 10 by attaching another header, such as a MAC header or an Ethernet (trade name) frame header.

The PDN_A 5 may be a Data Network (DN) configured to provide a communication service to the UE_A 10. Note that the DN may be constituted as a packet data service network or may be constituted for each service. The PDN_A 5 may further include a communication terminal connected to the PDN_A 5. Hence, connecting to the PDN_A 5 may be connecting to a communication terminal and/or a server device provided in the PDN_A 5. Transmitting and/or receiving user data to and/or from the PDN_A 5 may be transmitting and/or receiving user data to and/or from the communication terminal and/or the server device provided in the PDN_A 5. Note that the PDN_A 5 may be expressed as a DN, and a DN may be expressed as the PDN_A 5.

The access network refers to a radio network connecting to the UE_A 10 and/or the core network. The access network may be a 3GPP access network or a non-3GPP access network. Note that the 3GPP access network may be an Evolved Universal Terrestrial Radio Access Network (E-UTRAN)_A 80 or a Next Generation Radio Access Network (NextGen RAN)_A 120, and the non-3GPP access network may be a WLAN ANc 125. Note that the UE_A 10 may connect to the access network to the core network or connect to the core network via the access network, to connect.

The core network refers to an IP mobile communication network run by a Mobile Network Operator connecting to the access network and/or the PDN_A 5. The core network may be a core network for the mobile network operator that runs and manages the mobile communication system 1, or may be a core network for a virtual mobile operator or a service provider on virtual mobile communication such as a Mobile Virtual Network Operator (MVNO), a Mobile Virtual Network Enabler (MVNE). Note that the core network_B 190 may be an Evolved Packet Core (EPC) constituting an Evolved Packet System (EPS) or may be a Next Generation (NextGen) Core (NGC) constituting a Next Generation System (NextGen System (NGS)). The core network_B 190 may be a core network of a system providing a 5G communication service. Note that the core network_B 190 is not limited to this and may be a network for providing a mobile communication service.

Figure 3A:
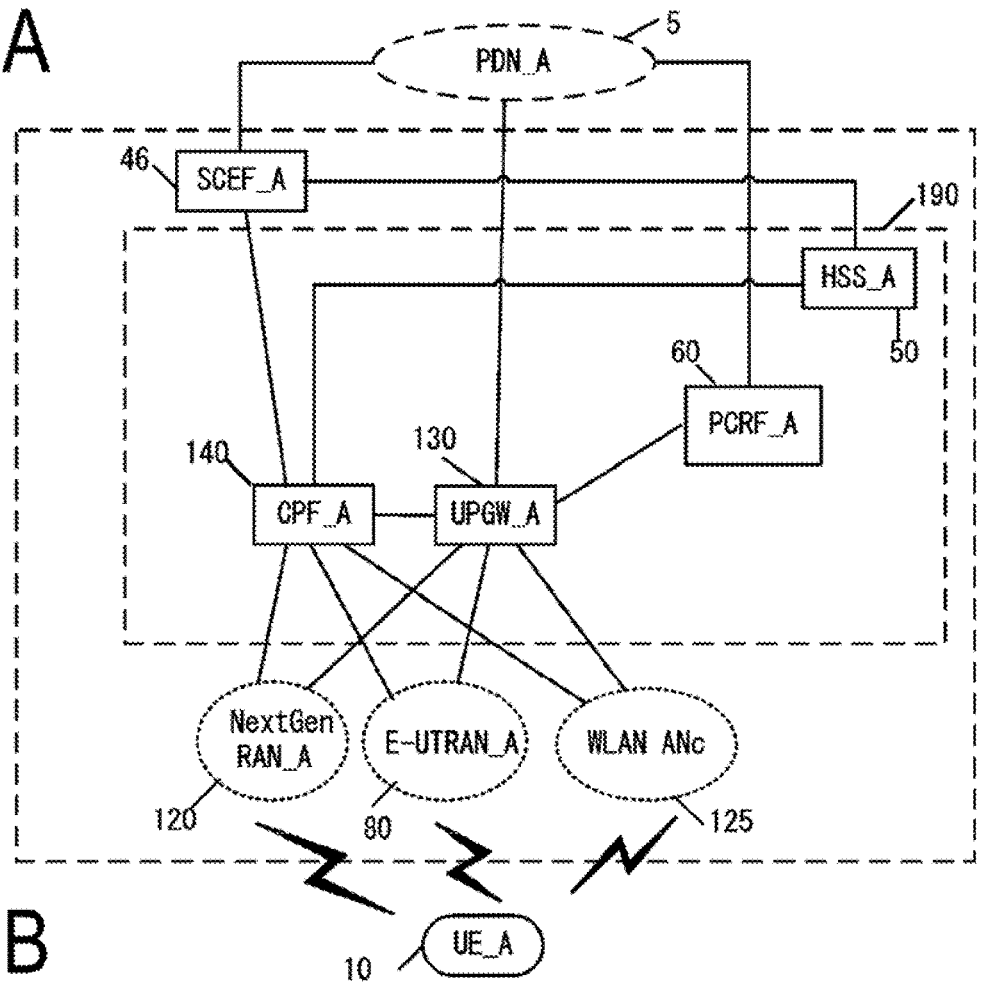
FIGS. 3A and 3B are diagrams illustrating an example of configurations of a core network and an access network, and the like in the mobile communication system.
Figure 3B:
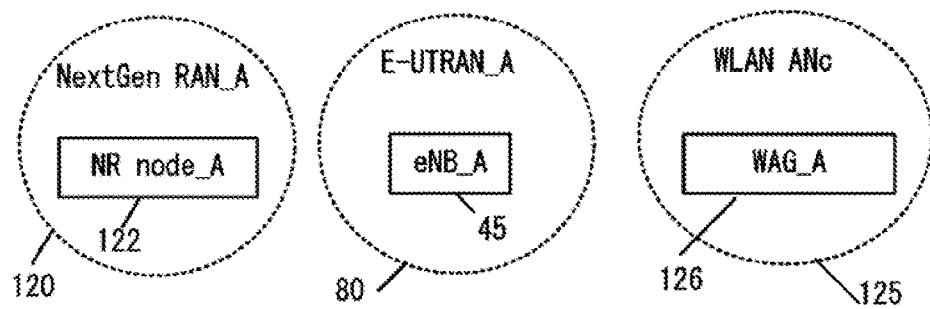

Next, a configuration example of the core network_B 190 will be described. An example of the configuration of the core network_B 190 will be described. FIGS. 3A and 3B illustrates an example of the configuration of the core network_B 190. The core network_B 190 in FIG. 3A is constituted of an HSS_A 50, a PCRF_A 60, a User Plane Gateway (UPGW)_A 130, a Control Plane Function (CPF)_A 140, and a SCEF_A 46.

The core network_B 190 is capable of connecting to multiple radio access networks (the E-UTRAN_A 80, the NextGen RAN_A 120, and the WLAN ANc 125). Such a radio access network may have a configuration of connecting to multiple different access networks, or may have a configuration of connecting to any one of the access networks. Moreover, the UE_A 10 is capable of wirelessly connecting to the radio access network.

The E-UTRAN_A 80 and the NextGen RAN_A 120 can configure access networks connectable in a 3GPP access system. Moreover, a WLAN Access Network c (WLAN ANc 125) that connects to CPF_A 140 and the UPGW_A 130 can configure access networks connectable in a WLAN access system. Each device will be described briefly hereinafter.

The UPGW_A 130 is a device connected to the PDN_A 5, the PCRF_A 60, the CPF_A 140, the E-UTRAN 80, the NextGen RAN_A 120, and the WLAN ANc 125, and serves as a relay device configured to transfer user data by functioning as a gateway between the PDN_A 5 and/or a DN and the core network_B 190. Note that the UPGW_A 130 may be a gateway for IP communication and/or non-IP communication. The UPGW_A 130 may have a function of transferring IP communication or may have a function of converting between non-IP communication and IP communication. Note that multiple gateways thus configured may be provided in the core network_B 190. Each of the multiple gateways thus provided may be a gateway configured to connect the core network_B 190 and a single DN. Note that the UPGW_A 130 may have connectivity with another NF and may connect to each of devices via the other NF. Note that the UPGW_A 130 may be the SGW_A 35 and/or the PGW_A 30.

The PGW_A 30 is connected to the PDN_A 5, the SGWA_35, and the PCRF_A 60, and serves as a relay device configured to transfer user data by functioning as a gateway between the PDN_A 5 and/or a DN and the core network_B 190. Note that the PGW_A 30 may be a gateway for IP communication and/or non-IP communication.

The PGW_A 30 may have a function of transferring IP communication or may have a function of converting between non-IP communication and IP communication. Note that multiple gateways thus configured may be provided in the core network_B 190. Each of the multiple gateways thus provided may be a gateway configured to connect the core network_B 190 and a single DN.

Note that a User Plane (U-Plane) may be a communication path for transmitting and/or receiving user data and may include multiple bearers. A Control Plane (C-Plane) may be a communication path for transmitting and/or receiving a control message and may be constituted of multiple bearers.

The PGW_A 30 may be connected to a UP function and a Policy function or may be connected to the UE_A 10 via the U-Plane. The PGW_A 30 may be constituted together with the UPGW_A 130.

The SGW_A 35 is connected to the PGW_A 30, the MME_A 40, and the E-UTRAN_A 80, and serves as a relay device configured to transfer user data by functioning as a gateway between the core network_B 190 and the 3GPP access networks (the E-UTRAN_A 80 and the NextGen RAN_A 120).

The SGW_A 35 may further be a UP function configured to transfer user data having a contact with the access network, or may be the User Plane Gateway (UPGW)_A 130, which is a gateway for transferring user data between the access network and the core network.

The CPF_A 140 is a device connected to the UPGW_A 130, the E-UTRAN_A 80, the NextGen RAN_A 120, the WLAN ANc 125, the HSS_A 50, and the SCEF_A 46. The CPF_140 may be an NF configured to play a role of mobility management of the UE_A 10 and the like, an NF configured to play a role of session management of a PDU session or the like, or an NF configured to manage one or multiple NSIs. The CPF_140 may be an NF configured to play one or multiple of the above roles. Note that the NF may be one or multiple devices provided in the core network_B 190, may be a Control Plane Function or Control Plane Network Function (CP function) for control information and/or a control message, or may be a common Control Plane (CP) Network Function (Common CPNF (CCNF)) that is common to the multiple NSIs. Note that the CPF_A 140 may have connectivity with another NF or may connect to each of devices via the other NF. Note that the CPF_A 140 may be an MME_A 40.

The MME_A 40 is connected to the SGW_A 35, the access networks, the HSS_A 50, and the SCEF_A 46, and serves as a control device configured to perform location information management, which includes mobility management, and access control for the UE_A 10 via the access networks. The MME_A 40 may also include a function as a session management device configured to manage each session established by the UE_A 10.

Multiple control devices thus configured may be provided in the core network_B 190, and a location management device different from the MME_A 40 may be constituted, for example. The location management device different from the MME_A 40 may be connected to, like the MME_A 40, the SGW_A 35, the access networks, the SCEF_A 46, and the HSS_A 50.

In a case that multiple MMEs are included in the core network_B 190, the MMEs may be connected to each other. With this configuration, the context of the UE_A 10 may be transmitted and/or received between the MMES. Hence, the MME_A 40 is a management device configured to transmit and/or receive control information associated with mobility management and session management to and/or from the UE_A 10, and may, in other words, be any Control Plane (C-Plane (CP)) control device.

A description has been given of an example in which the MME_A 40 is configured by being included in the core network_B 190. However, the MME_A 40 may be a management device configured in one or multiple core networks, DCNs, or NSIs, or may be a management device connected to one or multiple core networks, DCNs, or NSIs. Here, the multiple DCNs or NSIs may be run by a single network operator or may be run by respective different network operators.

The MME_A 40 may be a relay device configured to transfer user data by functioning as a gateway between the core network_B 190 and the access network. Note that the user data transmitted and/or received from and/or by the MME_A 40 functioning as a gateway may be small data.

The MME_A 40 may be an NF configured to play a role of mobility management of the UE_A 10 and the like, an NF configured to play a role of session management of a PDU session or the like, or an NF configured to manage one or multiple NSIs. The MME_A 40 may be an NF configured to play one or multiple of the above roles. Each of the NFs may be one or multiple devices provided in the core network_B 190, a Control Plane Function (CP function (CPF))(referred to also as a Control Plane Network Function) for control information and/or a control message or may be a common CP function that is in common to multiple NSIs.

Here, an NT is a processing function configured in a network. Specifically, the NF may be a functional device, such as an MME, an SGW, a PGW, a CPF, or a UPGW, or may be a function and capability information of Mobility Management (MM), Session Management (SM) or the like. The NT may be a functional device for performing a single function or may be a functional device for performing multiple functions. For example, an NF for performing an MM function and an NF for performing a SM function may exist separately, or an NF for performing both an MM function and an SM function may exist.

The SCEF_A 46 is connected to the PDN_A 5, the CPF_A 140, or the MME_A 40, and the HSS_A 50, and serves as a relay device configured to transfer user data by functioning as a gateway between the PDN_A 5 and/or the DN and the core network_B 190. Note that the SCEF_A 46 may be a gateway for non-IP communication. The SCEF_A 46 may have a function of converting between non-IP communication and IP communication. Multiple gateways thus configured may be provided in the core network_B 190. Multiple gateways connecting the core network_B 190 and the single PDN_A 5 and/or the DN may also be provided. Note that the SCEF_A 46 may be configured outside or inside the core network.

The HSS_A 50 is connected to the MME_A 40 and the SCEF_A 46 and serves as a managing node that manages subscriber information. The subscriber information of the HSS_A 50 is referred to at the time of access control by the MME_A 40, for example. Moreover, the HSS_A 50 may be connected to a location management device different from the MME_A 40. For example, the HSS_A 50 may be connected to the CPF_A 140.

The PCRF_A 60 is connected to the UPGW_A 130 or the PGW_A 130, and the PDN_A 5, and is configured to perform QoS management on data delivery. For example, the PCRF_A 60 manages QoS of a communication path between the UE_A 10 and the PDN_A 5. The PCRF_A 60 may further be a device configured to create and/or manage a Policy and Charging Control (PCC) rule and/or a routing rule used by each of devices to transmit and/or receive user data.

The PCRF_A 60 may be a Policy function configured to create and/or manage a policy. More specifically, the PCRF_A 60 may be connected to the UP function.

As illustrated in the drawing, each of the radio access networks includes a device to which the UE_A 10 is actually connected (e.g., a base station apparatus or an access point device) or the like. The devices used in these connections can be thought of as devices adapted to the radio access networks.

In the present embodiment, the E-UTRAN_A 80 is a Long Term Evolution (LTE) access network and includes the eNB_A 45. The eNB_A 45 is a radio base station to which the UE_A 10 connects through an Evolved Universal Terrestrial Radio Access (E-UTRA), and the E-UTRAN_A 80 may include one or multiple eNBs_A 45. Furthermore, the multiple eNBs may connect to each other.

The NextGen RAN_A 120 is a 5G access network and includes a New Radio Access Technology node (NR node)_A 122. The NR node_A 122 is a radio base station to which the UE_A 10 connects through a Next Generation Radio Access (NextGen RA), and the NextGen RAN_A 120 may include one or multiple NR nodes_A 122.

The NextGen RAN_A 120 may be an access network constituted of an E-UTRA and/or a NextGen RA. In other words, the NextGen RAN_A 120 may include the eNB_A 45 or the NR node_A 122, or may include both. In this case, the eNB_A 45 and the NR node_A 122 may be similar devices. Hence, the NR node_A 122 may be replaced with the eNB_A 45.

The WLAN ANc 125 is a radio LAN access network and includes a WAG_A 126. The WLAN Access Gateway (WAG)_A 126 is a radio base station to which the UE_A 10 connects through a radio LAN access, and the WLAN ANc 125 may include one or multiple WAGs_A 126. The WAG_A 126 may be a gateway between the core network_B 190 and the WLAN ANc 125. In the WAG_A 126, a radio base station function unit and a gateway function unit may be constituted of different devices.

Note that herein, the UE_A 10 being connected to radio access networks refers to the UE_A 10 being connected to a base station apparatus, an access point, or the like included in each of the radio access networks, and data, signals, and the like being transmitted and/or received also pass through the base station apparatus, the access point, or the like. Note that control messages transmitted and/or received between the UE_A 10 and the core network_B 190 may be the same control message irrespective of types of access networks. Hence, the UE_A 10 and the core network_B 190 transmitting and/or receiving messages via the NR node_A 122 may be the same as the UE_A 10 and the core network_B 190 transmitting messages via the eNB_A 45 and/or the WAG_A 126.

1.2. Device Configuration

First, identification information stored in each of the devices will be described. International Mobile Subscriber Identity (IMSI) is permanent identification information of a subscriber (user) and is identification information assigned to a user using a UE. The IMSI stored by each of the UE_A 10, the MME_A 40/the CPF_A 140, and the SGW_A 35 may be the same as the IMSI stored by the HSS_A 50.

The EMM State/MM State indicates a Mobility management state of the UE_A 10 or the MME_A 40/the CPF_A 140. For example, the EMM State/MM State may be an EMM-REGISTERED state in which the UE_A 10 is registered in the network (registered state) and/or an EMM-DEREGISTERED state in which the UE_A 10 is not registered in the network (deregistered state). The EMM State/MM State may be an ECM-CONNECTED state in which a connection between the UE_A 10 and the core network is maintained and/or an ECM-IDLE state in which the connection is released. Note that the EMM State/MM State may be information possible to distinguish between a state in which the UE_A 10 is registered in the EPC and a state in which the UE_A 10 is registered with the NGC.

The Globally Unique Temporary Identity (GUTI) is temporary identification information of the UE_A 10. The GUTI is constituted of identification information of the MME 40/the CPF_A 140 (Globally Unique MME identifier (GUMMEI) and identification information of the UE_A 10 in a specific MME 40/CPF_A 140 (M-Temporary Mobile Subscriber Identity (M-TMSI)). The ME-Identity is an ID of the UE_A 10 or ME and may be, for example, an International Mobile Equipment Identity (IMEI) or IMEI Software Version (IMEISV). The MSISDN indicates a basic phone number of the UE_A 10. The MSISDN stored by the MME_A 40/the CPF_A 140 may be information indicated by the storage unit of the HSS_A 50. Note that the GUTI may include information identifying the CPF_140.

The MME F-TEID is information identifying the MME_A 40/the CPF_A 140. The MME F-TEID may include an IP address of the MME_A 40/the CPF_A 140 or a Tunnel Endpoint Identifier (TEID) of the MME_A 40/the CPF_A 140, or may include both. The IP address of the MME_A 40/the CPF_A 140 and the TEID of the MME_A 40/the CPF_A 140 may be stored independently. The MME F-TEID may be identification information for user data or identification information for control information.

The SGW F-TEID is information identifying the SGW_A 35. The SGW F_TEID may include an IP address of the SGW_A 35 or a TEID of the SGW_A 35, or may include both. The IP address of the SGW_A 35 and the TEID of the SGW_A 35 may be stored independently. The SGW F-TEID may be identification information for user data or identification information for control information.

The PGW F-TEID may be information identifying the PGW_A 30/the UPGW_A 130. The PGW F-TEID may include an IP address of the PGW_A 30/the UPGV_A 130 or a TEID of the PGW_A 30/the UPGW_A 130, or may include both. The IP address of the PGW_A 30/the UPGW_A 130 and the TEID of the PGW_A 30/the UPGW_A 130 may be stored independently. The PGW F-TEID may be identification information for user data or identification information for control information.

The eNB F-TEID is information identifying the eNB_A 45. The eNB F-TEID may include an IP address of the eNB_A 45 or a TEID of the eNB_A 45, or may include both. The IP address of the eNB_A 45 and the TEID of the SGW_A 35 may be stored independently. The eNB F-TEID may be identification information for user data or identification information for control information.

The APN may be identification information identifying a core network and an external network, such as a DN. The APN may be used as information for selecting a gateway, such as the PGW_A 30/the UPGW_A 130 via which the core network_A 90 is connected.

Note that the APN may be identification information identifying such a gateway or identification information identifying the external network, such as a DN. Note that in a case that multiple gateways that connect the core network and the DN are provided, multiple gateways that are selectable based on the APN may be provided. A single gateway may be selected from among the multiple gateways in another method using identification information other than APN.

The UE Radio Access Capability is identification information indicating a radio access capability of the UE_A 10. The UE Network Capability includes an algorithm and a key derivative function of security supported by the UE_A 10. The MS Network Capability is information including at least one or multiple pieces of information necessary for the SGSN_A 42 to the UE_A 10 having the GERAN_A 25 and/or UTRAN_A 20 function. The Access Restriction is registration information for access restriction. The eNB Address is an IP address of the eNB_A 45. The MME UE S1AP ID is information identifying the UE_A 10 in the MME_A 40/the CPF_A 140. The eNB UE S1AP ID is information identifying the UE_A 10 in the eNB_A 45.

The APN in Use is APN recently utilized. The APN in Use may be a Data Network Identifier. This APN may be constituted of identification information about the network and identification information about a default operator. The APN in Use may be information identifying a DN of a destination of a PDU session to be established.

The Assigned Session Type is information indicating a PDU session type. The Assigned Session Type may be an Assigned PDN Type. The PDU session type may be IP or non-IP. In a case that the PDU session type is IP, the Assigned Session Type may further include information indicating the type of PDN assigned by the network. Note that the Assigned Session Type may be IPv4, IPv6, or IPv4v6.

The IP Address indicates an IP address assigned to the UE unless otherwise noted. The IP address may be an IPv4 address, an IPv6 address, or an IPv6 prefix. Note that in a case that Assigned Session Type indicates non-IP, the Assigned Session Type need not include any IP Address element.

The SCEF ID is an IP address of the SCEF_A 46 used in the PDU session. The Default Bearer is information acquired and/or created at a time of establishing the PDU session and is EPS bearer identification information for identifying a default bearer associated with the PDU session.

The EPS Bearer ID is identification information of the EPS bearer. The EPS Bearer ID may be identification information identifying a Signalling Radio Bearer (SRB) and/or a Control-plane Radio bearer (CRB) or may be identification information identifying a Data Radio Bearer (DRB). The Transaction Identifier (TI) is identification information identifying a bidirectional message flow (Transaction). Note that the EPS Bearer ID may be EPS bearer identification information identifying a dedicated bearer. Hence, the EPS Bearer ID may be identification information identifying an EPS bearer different from a default bearer. The TFT indicates all the packet filters associated with the EPS bearer. The TFT is information identifying part of user data to be transmitted and/or received, and the UE_A 10 transmits and/or receives the user data identified by the TFT, by using an EPS hearer associated with the TFT. In other words, the UE_A 10 transmits and/or receives the user data identified by the TFT, by using a Radio Bearer (RB) associated with the TFT. The TFT may be information that associates the user data, such as application data, to be transmitted and/or received with a suitable transfer path or may be identification information identifying application data. The UE_A 10 may transmit and/or receive user data not identifiable by the TFT, by using the default bearer. The UE_A 10 may store in advance a TFT associated with the default bearer.

The Default Bearer is EPS bearer identification information for identifying a default bearer associated with the PDU session. Note that the EPS bearer may be a logical communication path established between the UE_A 10 and the PGW_A 30/the UPGW_A 130. The EPS bearer may be a default bearer or may be a dedicated hearer. The EPS bearer may include an RB established between the UE_A 10 and a base station and/or an access point in an access network. The RB and the EPS bearer may have a one-to-one correspondence. Hence, identification information of the RB and the identification information of the EPS bearer may have a one-to-one correspondence or may be the same identification information. Note that the RB may be an SRB and/or a CRB, or may be a DRB. The Default Bearer may be information acquired by the UE_A 10 and/or the SGW_A 35 and/or the PGW_A 30/the UPGW_A 130 from the core network at the time of establishing the PDU session.

The User Identity may be information identifying a subscriber. The User Identity may be an IMSI or may be an MSISDN. The User Identity may be identification information other than an IMSI and an MSISDN. The Serving Node Information is information identifying the MME_A 40/the CPF_A 140 used in the PDU session and may be an IP address of the MME_A 40/the CPF_A 140.

The eNB Address is an IP address of the eNB_A 45. The eNB ID is information identifying the UE in the eNB_A 45. The MME_Address is an IP address of the MME_A 40/the CPF_A 140. The MME ID is information identifying the MME_A 40/the CPF_A 140. The NR node Address is an IP address of the NR node_A 122. The NR node ID is information identifying the NR node_A 122. The WAG Address is an IP address of the WAG_A 126. The WAG ID is information identifying the WAG_A 126.

The configuration of each device will be described below. Note that part of or all the functions of the devices to be described below and the units of the devices may run on physical hardware or may run on logical hardware virtually constituted with general-purpose hardware.

1.2.1. UE Configuration

Figure 4A:
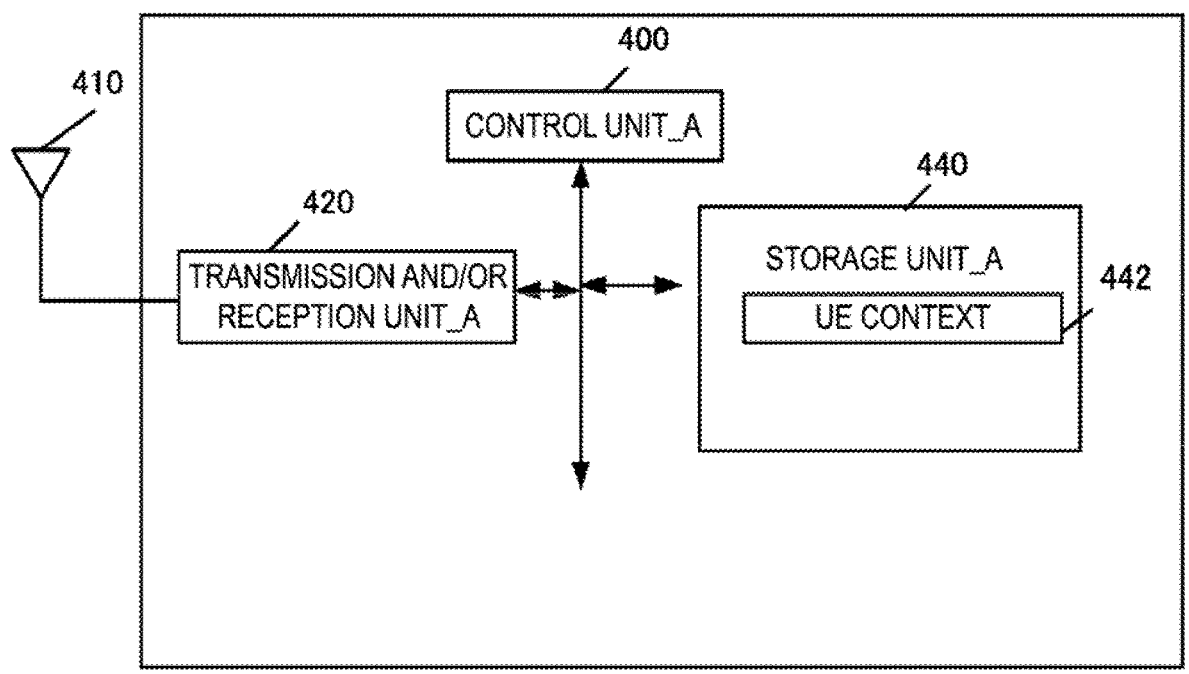
FIG. 4A is a diagram illustrating a device configuration of a UE.

FIG. 4 illustrates a device configuration of the UE_A 10. As illustrated in the drawing, the UE_A 10 includes a transmission and/or reception unit_A 420, a control unit_A 400, and a storage unit_A 440. The transmission and/or reception unit_A 420 and the storage unit_A 440 are connected to the control unit_A 400 via a bus. The control unit_A 400 is a function unit to control the UE_A 10. The control unit_A 400 implements various processes by reading out and performing various programs stored in the storage unit_A 440.

The transmission and/or reception unit_A 420 is a function unit through which the UE_A 10 connects to a base station and/or an access point in an access network to connect to the access network. An external antenna_A 410 is also connected to the transmission and/or reception unit_A 420. In other words, the transmission and/or reception unit_A 420 is a function unit for the UE_A 10 to connect to the base station and/or the access point in the access network. Furthermore, the transmission and/or reception unit_A 420 is a transmission and/or reception function unit through which the UE_A 10 transmits and/or receives user data and/or control information to and/or from the base station and/or the access point in the access network.

The storage unit_A 440 is a function unit configured to store programs, data, and the like necessary for each operation of the UE_A 10. The storage unit_A 440 is constituted of, for example, a semiconductor memory, a Hard Disk Drive (HDD), or the like. The storage unit_A 440 may store at least identification information and/or control information and/or a flag and/or a parameter included in a control message transmitted and/or received in a communication procedure to be described later. As illustrated in the drawing, the storage unit_A 440 stores a UE context 442. Hereinafter, information elements stored in the storage unit_A 440 will be described. Note that the UE context 442 may include a UE context to be used at a time of connecting to the core network_B 190 and a UE context to be used at a time of connecting to the core network_B 190. The UE context to be used at a time of connecting to the core network_B 190 and the UE context to be used at a time of connecting to the core network_B 190 may be stored together or may be stored separately.

First, FIG. 5B illustrates information elements included in a UE context stored for each UE. As illustrated in the drawing, the UE context stored for each UE includes an IMSI, an EMM State, a GUTI, and an ME Identity. Next, FIG. 5C illustrates a UE context for each PDU session or a PDN connection stored for each PDU session or PDN connection. As illustrated in the drawing, the UE context for each PDU session includes an APN in Use, an Assigned Session Type, an IP Address(es), and a Default Bearer.

FIG. 5D illustrates a UE context for each bearer stored in the storage unit of the UE. As illustrated in the drawing, the UE context for each bearer includes an EPS Bearer ID, a TI, and a TFT.

1.2.2. eNB/NR Node/WAG Configuration

Figure 6A:
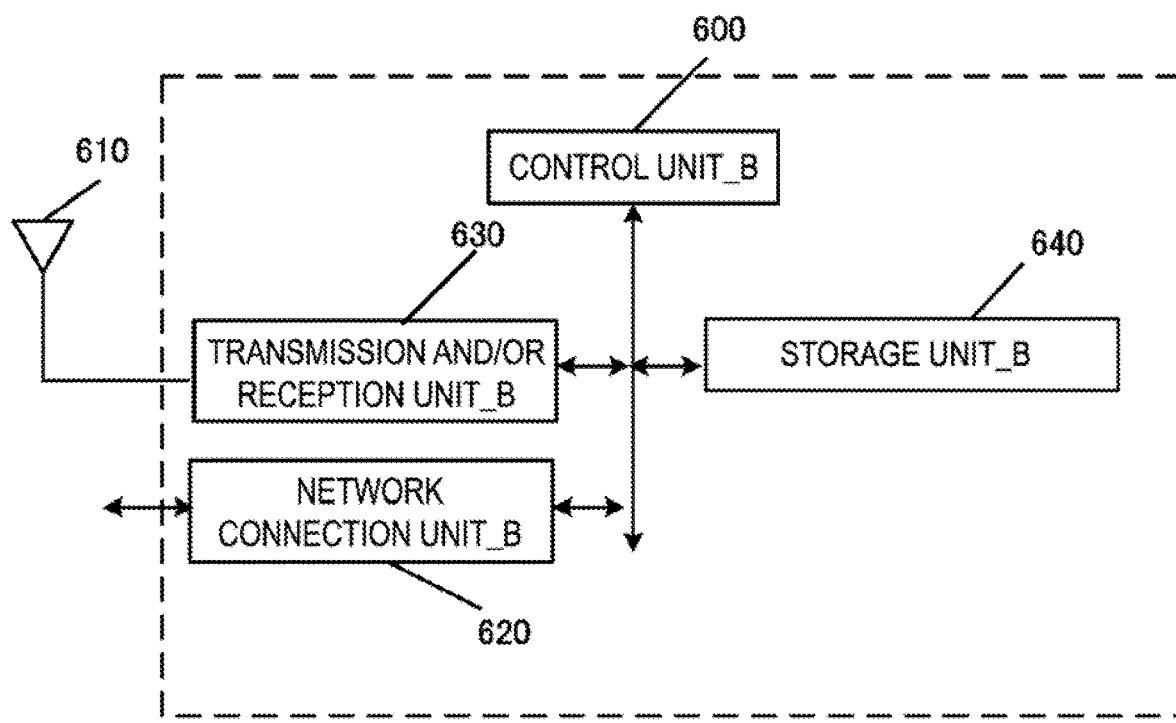
FIG. 6A is a diagram illustrating a device configuration of an eNB/NR node/WAG.

A configuration of the eNB_A 45, the NR node_A 122, and the WAG_A 126 will be described below. FIG. 6A illustrates a device configuration of the eNB_A 45, the NR node_A 122, and the WAG_A 126. As illustrated in the drawing, the eNB_A 45, the NR node_A 122, and the WAG_A 126 include a network connection unit_B 620, a transmission and/or reception unit_B 630, a control unit_B 600, and a storage unit_B 640. The network connection unit_B 620, the transmission and/or reception unit_B 630, and the storage unit_B 640 are connected to the control unit_B 600 via a bus.

The control unit_B 600 is a function unit for controlling the eNB_A 45. The control unit_B 600 implements various processes by reading out and performing various programs stored in the storage unit_B 640.

The network connection unit_B 620 is a function unit through which the eNB_A 45, the NR node_A 122, and the WAG_A 126 connect to the MME_A 40 and/or the SGW_A 35. Furthermore, the network connection unit_B 620 is a transmission and/or reception unit through which eNB_A 45, the NR node_A 122, and the WAG_A 126 transmit and/or receive user data and/or control information to and/or from the MME_A 40 and/or the SGW_A 35.

The transmission and/or reception unit_B 630 is a function unit through which the eNB_A 45, the NR node_A 122, and the WAG_A 126 connect to the UE_A 10. Furthermore, the transmission and/or reception unit_B 630 is a transmission and/or reception function unit configured to transmit and/or receive user data and/or control information to and/or from the UE_A 10. An external antenna_B 610 is connected to the transmission and/or reception unit_B 630.

The storage unit_B 640 is a function unit for storing programs, data, and the like necessary for each operation of the eNB_A 45, the NR node_A 122, and the WAG_A 126. The storage unit_B 640 is constituted of, for example, a semiconductor memory, a HDD, or the like. The storage unit_B 640 may store at least the identification information and/or the control information and/or the flag and/or the parameter included in the control message transmitted and/or received in the communication procedure to be described later. The storage unit_B 640 may store the above information as a context for each UE_A 10.

1.2.3. MME/CPF Configuration

Figure 7A:
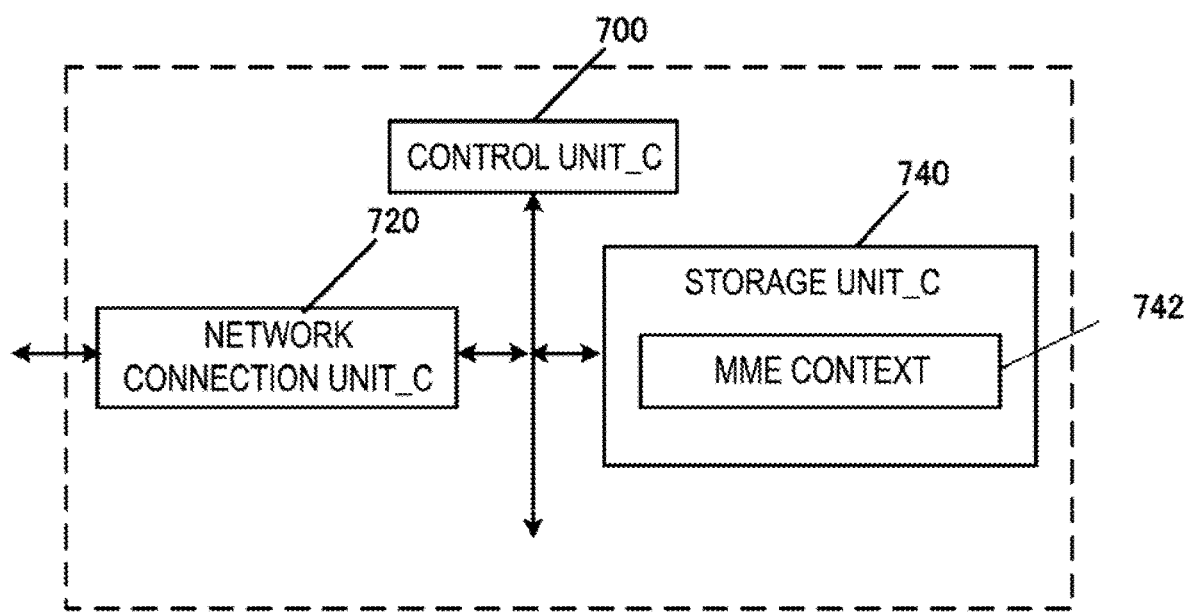
FIG. 7A is a diagram illustrating a device configuration of an MME/CPF.

A configuration of the MME_A 40 and the CPF_140 will be described below. FIG. 7A illustrates a device configuration of the MME_A 40 and the CPF_140. As illustrated in the drawing, the MME_A 40 and the CPF_140 include a network connection unit_C 720, a control unit_C 700, and a storage unit_C 740. The network connection unit_C 720 and the storage unit_C 740 are connected to the control unit_C 700 via a bus. Note that the functions of these units may run on physical hardware or may run on logical hardware virtually constituted with general-purpose hardware.

The control unit_C 700 is a function unit for controlling the MME_A 40 and the CPF_140. The control unit_C 700 implements various processes by reading out and performing various programs stored in the storage unit_C 740.

The network connection unit_C 720 is a function unit through which the MME_A 40 connects to the base station in the access network and/or the access point in the access network and/or the SCEF_A 46 and/or the HSS_A 50 and/or the SGW_A 35. Furthermore, the network connection unit_C 720 is a transmission and/or reception unit through which the MME_A 40 transmits and/or receives the user data and/or control information to and/or from the base station in the access network and/or the access point in the access network and/or the SCEF_A 46 and/or the HSS_A 50 and/or the SGW_A 35.

Furthermore, the network connection unit_C 720 is a function unit through which the CPF_140 connects to the base station in the access network and/or the access point in the access network and/or the SCEF_A 46 and/or the HSS_A 50 and/or the UPGW_A 130. Furthermore, the network connection unit_C 720 is a transmission and/or reception unit through which the MME_A 40 transmits and/or receives the user data and/or control information to and/or from the base station in the access network and/or the access point in the access network and/or the SCEF_A 46 and/or the HSS_A 50 and/or the UPGW_A 130.

The storage unit_C 740 is a function unit for storing programs, data, and the like necessary for each operation of the MME_A 40 and the CPF_140. The storage unit_C 740 is constituted of, for example, a semiconductor memory, a HDD, or the like. The storage unit_C 740 may store at least the identification information and/or the control information and/or the flag and/or the parameter included in the control message transmitted and/or received in the communication procedure to be described later.

As illustrated in the drawing, the storage unit_C 740 stores an MME context 742. Hereinafter, information elements stored in the storage unit_C 740 will be described. Note that the MME context may be a context stored by the CPF_140. First, FIG. 8B illustrates information elements included in the UE context stored for each UE. As illustrated in the drawing, the MME context stored for each UE includes one or multiple of an IMSI, an MSISDN, an MM State, a GUTI, an ME Identity, a UE Radio Access Capability, a UE Network Capability, a MS Network Capability, an Access Restriction, an MME F-TEID, an SGW F-TEID, an eNB Address, an MMEUE S1AP ID, an eNB UE S1AP ID, an NR node Address, an NR node ID, a WAG Address, and a WAG ID.

Next, FIG. 9C illustrates an MME context for each PDU session or PDN connection stored for each PDU session or PDN connection. As illustrated in the drawing, the MME context for each PDU session includes an APN in Use, an Assigned Session Type, an IP Address(es), a PGW F-TEID, a SCEF ID, and a Default bearer.

FIG. 9D illustrates the MME context for each bearer stored for each bearer. As illustrated in the drawing, the MME context stored for each bearer includes one or multiple of an EPS Bearer ID, a TI, a TFT, an SGW F-TEID, a PGW F-TEID, an MME F-TEID, an eNB Address, an NR node Address, a WAG Address, an eNB ID, an NR node ID, and a WAG ID. Here, the information elements included in the MME context illustrated in FIGS. 89, 9C, and 9D may be included in either the MM context or the EPS bearer context and stored.

1.2.4. SGW Configuration

Figure 10A:
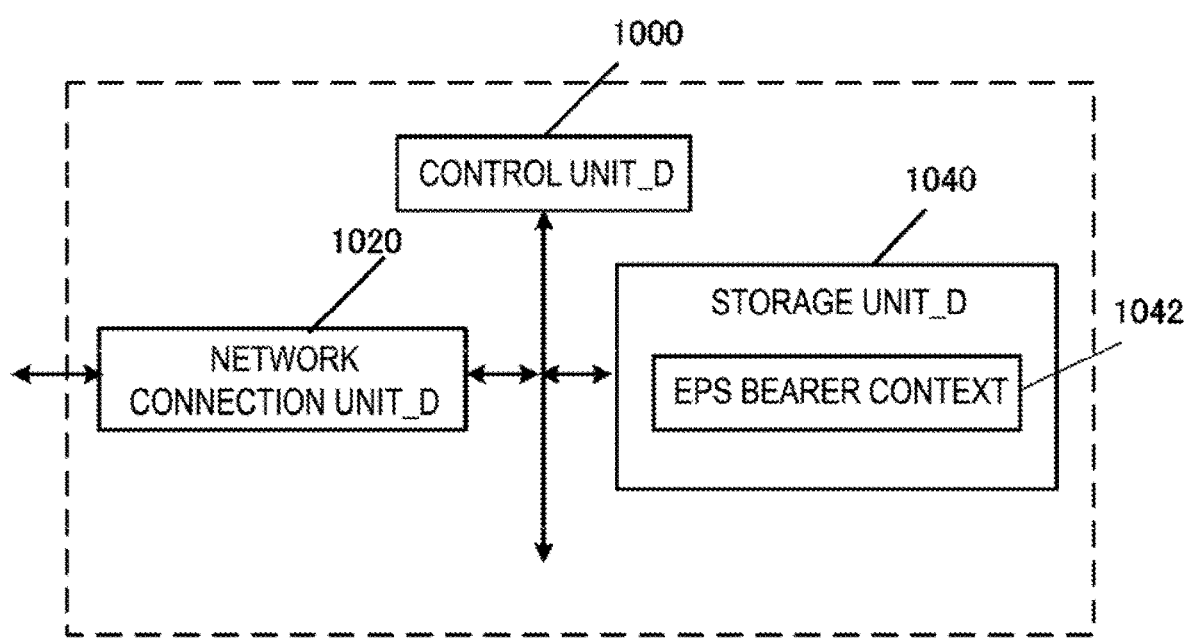
FIG. 10A is a diagram illustrating a device configuration of an SGW/PGW/UPGW/SCEF.

FIG. 10A illustrates a device configuration of the SGW_A 35. As illustrated in the drawing, the SGW_A 35 includes a network connection unit_D 1020, a control unit_D 1000, and a storage unit_D 1040. The network connection unit_D 1020 and the storage unit_D 1040 are connected to the control unit_D 1000 via a bus.

The control unit_D 1000 is a function unit for controlling the SGW_A 35. The control unit_D 1000 implements various processes by reading out and performing various programs stored in the storage unit_D 1040.

The network connection unit_D 1020 is a function unit through which the SGW_A 35 connects to the base station and/or the access point in the access network and/or the MME_A 40 and/or the PGW_A 30 and/or SGSN_A 42. Furthermore, the network connection unit_D 1020 is a transmission and/or reception unit through which the SGW_A 35 transmits and/or receives user data and/or control information to and/or from the base station and/or the access point in the access network and/or the MME_A 40 and/or the PGW_A 30 and/or SGSN_A 42.

The storage unit_D 1040 is a function unit configured to store programs, data, and the like necessary for each operation of the SGW_A 35. The storage unit_D 1040 is constituted of, for example, a semiconductor memory, a HDD, or the like. The storage unit_D 1040 may store at least the identification information and/or the control information and/or the flag and/or the parameter included in the control message transmitted and/or received in the communication procedure to be described later.

As illustrated in the drawing, the storage unit_D 1040 stores an EPS bearer context 1042. Note that the EPS bearer context 1042 includes an EPS bearer context stored for each UE, an EPS bearer context stored for each PDU session, and an EPS hearer context stored for each bearer.

First, FIG. 11B illustrates information elements of the EPS bearer context stored for each UE. As illustrated in the drawing, the EPS bearer context stored for each UE includes an IMSI, an ME Identity, an MSISDN, an MME F-TEID, and an SGW F-TEID.

Furthermore, the EPS bearer context includes an EPS bearer context for each PDU session stored for each PDU session. FIG. 11C illustrates the EPS bearer context for each PDU session. As illustrated in the drawing, the EPS bearer context for each PDU session includes an APN in Use, an Assigned Session Type, an SGW F-TEID, a PGW-TEID, a Default Bearer, and an IP Address(es).

Furthermore, the EPS bearer context includes the EPS bearer context for each bearer. FIG. 11D illustrates the EPS bearer context for each bearer. As illustrated in the drawing, the EPS bearer context for each bearer includes one or multiple of an EPS Bearer ID, a TFT, a PGW F-TEID, an SGW F-TEID, an eNB F-TEID, an MME Address, an NR node Address, a WAG Address, an MME ID, an NR node ID, and a WAG ID.

1.2.5. PGW/UPGW Configuration

FIG. 10A illustrates a device configuration of the PGW_A 30 and the UPGW_A 130. As illustrated in the drawing, the PGW_A 30 and the UPGW_A 130 includes the network connection unit_D 1020, the control unit_D 1000, and the storage unit_D 1040. The network connection unit_D 1020 and the storage unit_D 1040 are connected to the control unit_D 1000 via a bus. Note that the functions of these units may run on physical hardware or may run on logical hardware virtually constituted with general-purpose hardware.

The control unit_D 1000 is a function unit for controlling the PGW_A 30. The control unit_D 1000 implements various processes by reading out and performing various programs stored in the storage unit_D 1040.

The network connection unit_D 1020 is a function unit through which the PGW_A 30 is connected to the SGW_A 35 and/or the PCRF_A 60 and/or an ePDG_A 65 and/or an AAA_A 55 and/or a TWAG_A 74 and/or the PDN_A 5. The network connection unit_D 1020 is a transmission and/or reception unit through which the PGW_A 30 transmits and/or receives user data and/or control information to and/or from the SGW_A 35 and/or the PCRF_A 60 and/or the ePDG_A 65 and/or the AAA_A 55 and/or the TWAG_A 74 and/or the PDN_A 5.

The network connection unit_D 1020 is a function unit through which the UPGW_A 130 connects to the PCRF_A 60 and/or the UPGW_A 130 and/or the PDN_A 5. The network connection unit_D 1020 is a transmission and/or reception unit through which the PGW_A 30 transmits and/or receives user data and/or control information to and/or from the SGW_A 35 and/or the PCRF_A 60 and/or the ePDG_A 65 and/or the AAA_A 55 and/or the TWAG_A 74 and/or the PDN_A 5.

The storage unit_D 1040 is a function unit configured to store programs, data, and the like necessary for each operation of the PGW_A 30. The storage unit_D 1040 is constituted of, for example, a semiconductor memory, a HDD, or the like. The storage unit_D 1040 may store at least the identification information and/or the control information and/or the flag and/or the parameter included in the control message transmitted and/or received in the communication procedure to be described later.

As illustrated in the drawing, the storage unit_D 1040 stores an EPS bearer context 1042. Note that the EPS bearer context 1042 may store an EPS bearer context stored for each UE, an EPS bearer context stored for each APN, an EPS bearer context stored for each PDU session or PDN connection, and an EPS bearer context stored for each bearer, separately. Furthermore, the EPS bearer context may be a context stored in the UPGW_A 130.

FIG. 12B illustrates information elements included in the EPS bearer context stored for each UE. As illustrated in the drawing, the EPS bearer context stored for each UE includes an IMSI, an ME Identity, an MSISDN, and a RAT type.

Next, FIG. 12C illustrates the EPS bearer context stored for each APN. As illustrated in the drawing, the EPS bearer context stored for each APN of the PGW storage unit includes an APN in use. Note that the EPS bearer context stored for each APN may be stored for each Data Network Identifier.

FIG. 12D illustrates the EPS bearer context for each PDU session or PDN connection stored for each PDU session or PDN connection. As illustrated in the drawing, the EPS bearer context for each PDU session or PDN connection includes an Assigned Session Type, an IP Address(es), an SGW F-TEID, a PGW F-TEID, and a Default Bearer.

FIG. 12E illustrates the EPS bearer context stored for each EPS bearer. As illustrated in the drawing, the EPS bearer context includes an EPS Bearer ID, a TFT, an SGW F-TEID, and a PGW F-TEID.

1.2.6. SCEF Configuration

FIG. 10A illustrates a device configuration of the SCEF_A 46. As illustrated in the drawing, the SCEF_A 46 includes the network connection unit_D 1020, the control unit_D 1000, and the storage unit_D 1040. The network connection unit_D 1020 and the storage unit_D 1040 are connected to the control unit_D 1000 via a bus.

The control unit_D 1000 is a function unit for controlling the SCEF_A 46. The control unit_D 1000 implements various processes by reading out and performing various programs stored in the storage unit_D 1040. The network connection unit_D 1020 is a function unit through which the SCEF_A 46 connects to the core network_B 190. In other words, the network connection unit_D 1020 is a function unit through which the SCEF_A 46 connects to the MME_A 40. The network connection unit_D 1020 is a transmission and/or reception unit through which the SCEF_A 46 transmits and/or receives the user data and/or control information to and/or from the MME_A 40.

The storage unit_D 1040 is a function unit configured to store programs, data, and the like necessary for each operation of the SCEF_A 46. The storage unit_D 1040 is constituted of, for example, a semiconductor memory, a HDD, or the like. The storage unit_D 1040 may store at least the identification information and/or the control information and/or the flag and/or the parameter included in the control message transmitted and/or received in the communication procedure to be described later.

As illustrated in the drawing, the storage unit_D 1040 stores an EPS bearer context 1042. Hereinafter, information elements stored in the storage unit_D 1040 will be described. FIG. 13B illustrates information elements included in the EPS bearer context. As illustrated in the drawing, the EPS bearer context includes a User Identity, an APN in Use, an EPS Bearer ID, and a Serving Node information.

1.3. Description of Initial Procedure

Next, before detailed steps of an initial procedure in the present embodiment are described, terminology specific to the present embodiment and primary identification information used in each procedure will be described beforehand in order to avoid redundant descriptions.

In the present embodiment, a network refers to an access network and/or the core network_B 190 and/or the PDN_A 5. A network may indicate any device included in an access network and/or the core network_B 190 and/or the PDN_A 5. In other words, a network performing message transmission and/or reception and/or a procedure means that a device in the network performs message transmission and/or reception and/or a procedure.

A first state in the present embodiment is a state where a procedure for connection and registration of the UE_A 10 to the core network_B 190 is completed and also each device has established a PDU session. Note that each device may perform a procedure for registering the UE_A 10 to the core network_B 190 and a procedure for establishing a PDU session simultaneously or separately. The first state may be a state where a tracking area update procedure for updating location registration information of the UE_A 10 is completed.

The first state in the present invention may be a state where each device has established a PDU session with the core network_B 190. More specifically, the first state may be a state where each device has established a PDU session between the UE_A 10 and the UPGW_A 130 via the NR node_A 122. Note that the first state is not limited to these states.

A tracking area in the present embodiment is a single or multiple areas that are managed by the core network and can be indicated by location information of the UE_A 10. The tracking area may be constituted of multiple cells. The tracking area may be an area in which a control message, such as paging, is broadcast, or may be an area in which the UE_A 10 can move without performing a handover procedure. The tracking area may be a routing area, a location area, or any area similar to these. The tracking area may be referred to as Tracking Area (TA) below.

A Tracking Area (TA) list in the present embodiment may be an information group indicating a list of tracking areas in which the network can establish a PDU session to the UE_A 10.

MO mode in the present embodiment is a mode in which the UE_A 10 has stopped receiving paging from the network and performing a periodic tracking area update procedure, or a mode in which the network has stopped transmitting paging and performing a periodic tracking area update procedure from the UE_A 10. MO mode may be MO only mode. MO mode may be a state in which resources of the core network and the access network are released.

In the present embodiment, a normal mode refers to a mode in which the UE_A 10 is capable of receiving paging from the network and perform a periodic tracking area update procedure, or a mode in which the network is capable of transmitting paging and performing a periodic tracking area update procedure from the UE_A 10. The normal mode may be a state in which the resources of the core network and the access network are not released.

MO capability in the present embodiment is capability information indicating whether or not the UE_A 10 or the network has a capability of supporting communication in MO mode and PDU session or bearer establishment for communication in MO mode.

A Network Slice Instance (NSI) in the present embodiment refers to an instance of one or multiple Network Slices constituted in the core network_B 190. The NSI in the present embodiment may be constituted of a virtual Network Function (NF) generated by using a Network Slice Template (NST). Here, the NST is a logical expression of one or multiple Network Functions (NFs) associated with a resource request for providing a requested communication service and/or capability.

In other words, the NSI may be an aggregate constituted of multiple NFs in the core network_B 190. The NSI may be a logical network constituted to separate user data delivered through a service and the like. A network slice may be constituted of at least one or more NFs. The NF(s) constituting the network slice may be or not necessarily be a device that is shared by another network slice. One or multiple network slices may be assigned to the UE, based on a UE usage type and/or one or multiple network slice type IDs and/or one or multiple pieces of registration information, such as NS IDs, and/or APNs.

Next, identification information in the present embodiment will be described.

First identification information in the present embodiment is information identifying a network slice type and/or a service type and managed for each Public Land Mobile Network (PLMN). The first identification information may be Network Slice selection Assistance information (NSSAI). At least one or more of second identification information may be constituted in the first identification information.

The second identification information in the present invention is information identifying and/or indicating a network slice type. The second identification information may be information such as an NSD ID identifying an NSI, a network slice type ID identifying the type of network slice, or the like. The second identification information may be a UE usage type or part of UE usage type. The second identification information may be an APN. Note that the second identification information may be constituted of information identifying one or multiple NSIs. The second identification information may include information identifying a Network Function (NF) in the core network_B 190. The second identification information may be registration information of the UE_A 10 held in the UE_A 10 and/or any of the devices in the network. Note that the NSI ID indicated by the second identification information may be selected and then determined based on the NNSAI transmitted by the UE_A 10, by any of the NR, node_A 122, the CCNF, and the CPF_A 140, and the UE_A 10 may be notified of the NSI ID. In other words, the NSI ID indicated by the second identification information may be selected and determined based on the NNSAI transmitted by the UE_A 10, by the access network or the core network_B 190, and the UE_A 10 may be notified of the NSI ID.

The third identification information in the present embodiment is identification information used in the access network to select a CCNF. Specifically, the third identification information may be information identifying a CCNF. The third identification information may be an information group in which a CCNF and an NSI are associated with each other. Alternatively, the third identification information may be information identifying an information group associating a CCNF and an NSI with each other. Each device may select a CCNF or an NSI to which the UE_A 10 connects, by using the third identification information. For example, each device may resolve, based on the information group associating an NSI and a CCNF associated by the third identification information, the NSI and/or CCNF by using the third identification information. Note that the third identification information may be temporary information assigned to the UE_A 10 by a device included in the CCNF or network and may be a Temporary ID (Temp ID). Thus, the Temp ID may be temporary identification information associated with any of the information group associating the NSI and the CCNF to be associated, the NSI, and the CCNF.

Note that the Temp ID indicated by the third identification information may be selected and then determined by any of the NR node_A 122, the CCNF, and the CPF_A 140, based on the NNSAI transmitted from the UE_A 10, and the UE_A 10 may be notified of the Temp ID. In other words, the Temp ID indicated by the third identification information may be selected and/or determined by the access network or the core network_B 190, based on the NNSAI transmitted from the UE_A 10, and the UE_A 10 may be notified of the Temp ID.

Note that the UE_A 10 that has received the Temp ID may transmit the Temp ID to the CPF_A 140 by including the Temp ID in a NAS message to be transmitted later. The CPF_A 140 may resolve, as a transmission destination, the NSI of the transmission destination and/or a control device included in the core network_B 190, based on the received Temp ID, and transmit a NAS message. The UE_A 10 that has received the Temp ID may transmit the Temp ID to the NR node_A 122 by including the Temp ID in an RRC message to be transmitted by including the NAS message, in subsequent transmission of the NAS message. The NR node_A 122 may resolve, as a transmission destination, the CCNF of the transmission destination, i.e., the CPF_A 140, based on the received Temp ID, and then transmit the NSA message.

Fourth identification information in the present embodiment is temporary identification information identifying a UE. The fourth identification information may be a M-Temporary Mobile Subscriber Identity (M-TIMI) assigned to the UE_A 10 by the MME_A 40. The fourth identification information may be the same value as that of the third identification information. In other words, the fourth identification information may be information identifying the UE_A 10 and information identifying a CCNF.

Fifth identification information in the present embodiment is information or an information group including at least one or more pieces of identification information of the second identification information to the fourth identification information. The fifth identification information including one or more pieces of identification information may be used as a single piece of identification information. Alternatively, the fifth identification information may mean a set of one or more pieces of identification information included in the fifth identification information. Accordingly, in a case of a description of transmitting the fifth identification information in the present embodiment, this means to transmit each piece of information or an information group included in the fifth identification information. Similarly, in a case of a description of receiving the fifth identification information in the present embodiment, this means to receive each piece of information or an information group included in the fifth identification information. The fifth identification information may be information including one or more of the second identification information to the fourth identification information allowed to the UE_A 10 by the network.

Note that the M-TMSI indicated by the fourth identification information may be selected and then determined by any of the NR node_A 122, the CCNF, and the CPF_A 140, based on the NNSAI transmitted by the UE_A 10, and the UE_A 10 may be notified of the M-TMSI. In other words, the M-TMSI indicated by the fourth identification information may be selected and/or determined by the access network or the core network_B 190, based on the NNSAI transmitted by the UE_A 10, and the UE_A 10 may be notified of the M-TMSI.

The fifth identification information in the present embodiment is information or an information group including at least one or more pieces of identification information of the second identification information to the fourth identification information. The fifth identification information including one or more pieces of identification information may be used as a single piece of identification information. Alternatively, the fifth identification information may mean a set of one or more pieces of identification information included in the fifth identification information. Accordingly, in a case of a description of transmitting the fifth identification information in the present embodiment, this means to transmit each piece of information or an information group included in the fifth identification information. Similarly, in a case of a description of receiving the fifth identification information in the present embodiment, this means to receive each piece of information or an information group included in the fifth identification information. The fifth identification information may be information including one or more of the second identification information to the fourth identification information allowed to the UE_A 10 by the network.

Note that the M-TMSI indicated by the fourth identification information may be selected and then determined by any of the NR node_A 122, the CCNF, and the CPF_A 140, based on the NNSAI transmitted by the UE_A 10, and the UE_A 10 may be notified of the M-TMSI. In other words, the M-TMSI indicated by the fourth identification information may be selected and/or determined by the access network or the core network_B 190, based on the NNSAI transmitted by the UE_A 10, and the UE_A 10 may be notified of the M-TMSI.

In the present embodiment, the sixth identification information is a value set in a first timer by the UE_A 10. Here, the first timer is a timer for the UE_A 10 to count available time of eleventh identification information, and a second timer is a timer for counting for management of expiry of the eleventh identification information by the network. Here, the eleventh identification information may be any information among the fifth identification information, the Temp ID, information combining the NSI and the Temp ID, information combining the Temp ID and the M-TMSI, and information combining the NSI, Temp ID, and the M-TMSI. Note that information combining pieces of information may mean a set of combined pieces of information or information including the pieces of information. In the present embodiment, the sixth identification information is a value obtained by the UE_A 10 from the network in the attach procedure and/or the tracking area update procedure of the present embodiment.

Note that in a case that the fifth identification information is treated as a set of one or more pieces of identification information, the sixth identification information may similarly be a set of multiple values of the first timer or a single value of the first timer. Specifically, in a case that the fifth identification information is a set of the second identification information and the third identification information, the sixth identification information may be a set of a value of the first timer to be used to count available time of the second identification information and a value of the first timer to be used to count available time of the third identification information, or a value of the first timer to be used to count available time common to the second identification information and the third identification information.

Hence, the network transmits the sixth identification information and thereby transmits a value of a timer counting available time of the eleventh identification information, to be consequently able to request to start counting of a timer, based on the timer value thus transmitted. Moreover, the UE_A 10 receives the eleventh identification information and thereby receives the value of the timer counting available time of the identification information of the eleventh identification information, to be consequently able to start counting of the timer, based on the timer value thus received. In other words, the network is able to notify the UE_A 10 of the available time of the eleventh identification information by transmitting the eleventh identification information. Moreover, the UE_A 10 is able to detect the available time of the eleventh identification information by receiving the eleventh identification information.

In the present embodiment, the seventh identification information is information indicating that restriction is imposed on connection to a specific one(s) of and/or part of and/or all the NSIs requested by the UE_A 10 and service to the UE_A 10 from the above NSIs. In other words, the seventh identification information is information indicating that restriction is imposed on establishment of a PDU session and establishment of a bearer with a specific one(s) of and/or part of and/or all the NSIs requested by the UE_A 10. The seventh identification information may be information for referring to the NSI(s) with which connection is restricted or information indicating the NSI(s) with which connection is restricted. The seventh identification information may be a set or list of multiple pieces of identification information, and may, for example, be a list of NSIs for which connection is restricted. The seventh identification information may be an NSI restricted area. Thus, the seventh identification information may be information associating an NSI and a restricted area with each other. The seventh identification information may be an information group including pieces of information associating, for each NSI, the NSI and a restricted area with each other.

In the present embodiment, eighth identification information is information indicating that connection to a specific one(s) of and/or part of and/or all the NSIs requested by the UE_A 10 is allowed. In other words, the eighth identification information is information indicating that establishment of a PDU session and establishment of a bearer with a specific one(s) of and/or part of and/or all the NSIs requested by the UE_A 10 are allowed. The seventh identification information may be information for referring to the NSI(s) with which connection is allowed or information indicating the NSI(s) with which connection is allowed. These may be a set or list of multiple pieces of identification information, and may, for example, be a list of NSIs with which connection is allowed. The eighth identification information may be an NSI allowed area. Thus, the eighth identification information may be information associating an NSI and an allowed area with each other. The eighth identification information may be an information group including pieces of information associating, for each NSI, the NSI and an allowed area with each other.

In the present embodiment, ninth identification information is a TA list associated with NSIs. In the present embodiment, in a case that the UE_A 10 connects to multiple NSIs, the ninth identification information may be independent for each NSI, or the ninth identification information may be constituted of multiple TA lists. Note that information content of tracking area information included in each TA list may be changed according to a location of the UE_A 10 and a base station to which the UE_A 10 connects. Note that these kinds of information may be information configured by an operator.

Tenth identification information in the present embodiment is information or an information group including at least one or more pieces of identification information of the second identification information to the fourth identification information. The tenth identification information including one or more pieces of identification information may be used as a single piece of identification information. Alternatively, the tenth identification information may mean a set of one or more pieces of identification information included in the tenth identification information. Accordingly, in a case of a description of transmitting the tenth identification information in the present embodiment, this means to transmit each piece of information or an information group included in the tenth identification information. Similarly, in a case of a description of receiving the tenth identification information in the present embodiment, this means to receive each piece of information or an information group included in the tenth identification information. The tenth identification information is information indicating a state of connection requested by the UE_A 10 and including one or more of the second identification information to the fourth identification information. In other words, the tenth identification information is information including one or more of the second identification information to the fourth identification information requested by the UE_A 10.

In the present embodiment, twenty-first identification information is MO capability of the UE_A 10. Specifically, the twenty-first identification information may be capability information indicating that the UE_A 10 supports changes to MO mode and/or communication in MO mode. Alternatively, the twenty-first identification information may be capability information indicating that the UE_A 10 is not able to support changes to MO mode and/or communication in MO mode.

In the present embodiment, twenty-second identification information may be identification information for indicating that the UE_A 10 requests change to MO mode and establishment of a PDU session and/or establishment of a bearer for performing communication in MO mode. The twenty-second identification information may be a message indicator. The twenty-second identification information may be information indicating that data buffering is requested to the network or information including information indicating a request of data buffering to the network. Alternatively, the twenty-second identification information may be information indicating that data buffering is not requested to the network or information including information indicating that data buffering to the network is not requested.

In the present embodiment, twenty-third identification information is information and/or an information group including at least one or more pieces of identification information of the twenty-first identification information and the twenty-second identification information. The twenty-third identification information that is a group of information including one or more pieces of identification information, may be used as a single piece of identification information or may mean a set of one or more pieces of identification information included in the twenty-third identification information. Accordingly, in a case of a description of transmitting the twenty-third identification information in the present embodiment, this means to transmit each piece of information or the information group included in the twenty-third identification information. Similarly, a case of a description of receiving the twenty-third identification information, in the present embodiment, means to receive each piece of information or the information group included in the twenty-third identification information.

In the present embodiment, twenty-fourth identification information is MO capability of the network. Specifically, the twenty-fourth identification information may be capability information indicating that the network supports change to MO mode and/or communication in MO mode. Alternatively, the twenty-fourth identification information may be capability information indicating that the network does not support change to MO mode and/or communication in MO mode.

In the present embodiment, twenty-fifth identification information is accepting information indicating that the network has accepted a change to MO mode. Furthermore, the twenty-fifth identification information may be identification information for indicating that the network allows a change to MO mode and establishment of a PDU session and/or a bearer for performing communication in MO mode. The twenty-fifth identification information may be a message indicator. The twenty-fifth identification information may be information indicating that the network allows data buffering or information including information indicating that the network allows data buffering. Alternatively, the twenty-fifth identification information may be capability information indicating that the network allows data buffering or information including information indicating that the network allows data buffering.

In the present embodiment, the twenty-sixth identification information is information and/or an information group including at least one or more pieces of identification information of the twenty-fourth identification information and the twenty-fifth identification information. The twenty-sixth identification information, which is a group of information including one or more pieces of identification information, may be used as a single piece of identification information or may mean a set of one or more pieces of identification information included in the twenty-sixth identification information. Accordingly, in a case of a description of transmitting the twenty-sixth identification information in the present embodiment, this means to transmit each piece of information or the information group included in the twenty-sixth identification information. Similarly, in a case of a description of receiving the twenty-sixth identification information in the present embodiment, this means to receive each piece of information or the information group included in the twenty-sixth identification information.

In the present embodiment, twenty-seventh identification information is information indicating that a UE is in an area where the network imposes restriction on communication in MO mode. Moreover, the twenty-seventh identification information may be information indicating the area in which the network imposes restriction on communication in MO mode. Note that the network may associate area information and an NSI with each other and transmit the area information and the NSI to the UE_A 10. In a case that the UE_A 10 connects to multiple NSIs, the network may transmit, for each of the NSIs, multiple pieces of information associating area information and the NSI with each other. Each piece of area information may be information indicating a different area.

In the present embodiment, twenty-eighth identification information is information indicating that a UE is in an area where the network allows communication in MO mode. Moreover, the twenty-eighth identification information may be information indicating the area where the network allows communication in MO mode. Note that the network may associate area information and an NSI with each other and transmit the area information and the NSI to the UE_A 10. In a case that the UE_A 10 connects to multiple NSIs, the network may transmit, for each of the NSIs, multiple pieces of information associating area information and the NSI with each other. Each piece of area information may be information indicating a different area.

In the present embodiment, thirtieth identification information is information indicating the fifth identification information which the network requests to update. More specifically, the thirtieth identification information may be information indicating an information element of the fifth identification information which the network requests to update. For example, the thirtieth identification information may be information that can identify which identification information is to be updated, as identification information which is requested to be updated, among the second identification, the third identification information, the fourth identification information, and information combining two or more of the three pieces of information. Note that actual information of the thirtieth identification information may be information indicating the second identification, the third identification information, the fourth identification information, or information combining two or more of the three pieces of information. Which identification information is to be updated by using the thirtieth identification information among the second identification, the third identification information, the fourth identification information, and information combining two or more of the three pieces of information, may be determined by an operator policy. In other words, which identification information is to be updated among the second identification, the third identification information, the fourth identification information, and information combining two or more of the three pieces of information may be determined based on operation of an operator network, and content of the thirtieth identification information may be determined based on the determination.

In the present embodiment, thirty-first identification information is an entity of an element indicated by the thirtieth identification information. Specifically, the thirty-first identification information is information or an information group including one or more of the second identification information to the fourth identification information. The thirty-first identification information including one or more pieces of identification information, may be used as a single piece of identification information. Alternatively, the fifth identification information may mean a set of one or more pieces of identification information included in the fifth identification information. Accordingly, in a case of a description of transmitting the fifth identification information in the present embodiment, this means to transmit each piece of information or an information group included in the fifth identification information. Similarly, in a case of a description of receiving the fifth identification information in the present embodiment, this means to receive each piece of information or an information group included in the fifth identification information. Moreover, the fifth identification information may be information including one or more of the second identification information to the fourth identification information which the network requests the UE_A 10 to update. Note that the thirty-first identification information may be a value of the identification information indicated by the thirtieth identification information.

In the present embodiment, thirty-second identification information is a value to be set in the first timer by the UE_A 10 at a time of updating the information element indicated by the thirtieth identification information to the value of the thirty-first identification information. In other words, the thirty-second identification information may be information indicating available time of information updated based on the thirtieth identification information and/or the thirty-first identification information.

Hence, the network transmits the thirty-second identification information to thereby transmit a value of the timer counting the available time of the thirtieth identification information and/or the thirty-first identification information, and is consequently able to request to stop counting of the timer and to restart counting of the timer, based on the timer value thus transmitted. Furthermore, by receiving the thirty-second identification information, the UE_A 10 receives the value of the timer counting the available time of the thirtieth identification information and/or the thirty-first identification information, and is thus able to stop counting of the timer and to restart counting of the timer, based on the received timer value. In other words, by transmitting the thirty-second identification information, the network is able to request the UE_A 10 to update the available time of the thirtieth identification information and/or the thirty-first identification information. Moreover, by receiving the thirty-second identification information, the UE_A 10 is able to update the available time of the thirtieth identification information and/or the thirty-first identification information.

In the present embodiment, thirty-third identification information may be the same as the ninth identification information. In the present embodiment, the thirty-fourth identification information may be the same as the seventh identification information. In the present embodiment, the thirty-fifth identification information may be the same as the eighth identification information. In the present embodiment, thirty-sixth identification information may be the same as the twenty-seventh identification information. In the present embodiment, the thirty-seventh identification information may be the same as the twenty-eighth identification information.

In the present embodiment, the thirty-eighth identification information may be information indicating that the network requests a change of MO mode. Hence, the thirty-eighth identification information may be information indicating, between MO mode and a normal mode different from MO mode, a change from the current mode of the UE_A 10 to the other mode. Alternatively, the thirty-eighth identification information may be information indicating that a change from the normal mode to MO mode is requested or may be information indicating that a change from MO mode to the normal mode is requested. More specifically, the thirty-eighth identification information may be information identifying the mode requested to be changed to, from MO mode and the normal mode different from MO mode. For example, in a case of requesting a change to the normal mode, the thirty-eighth identification information may be information identifying the normal mode. In a case of requesting a change to MO mode, the thirty-eighth identification information may be information identifying MO mode.

In the present embodiment, the thirty-ninth identification information may be information indicating the mode to which the UE_A 10 has changed. In other words, the thirty-ninth identification information may be identification information indicating the normal mode or MO mode.

Figure 14:
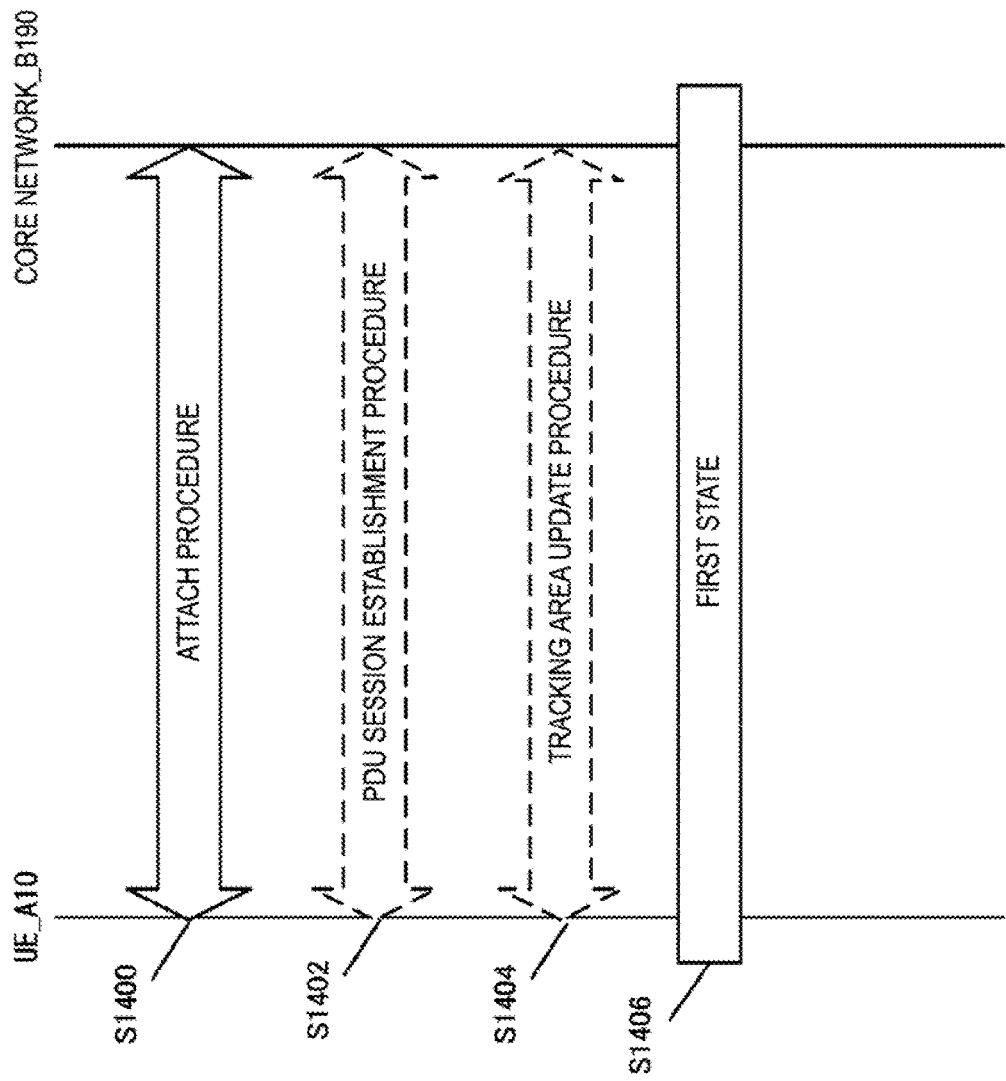
FIG. 14 is a diagram illustrating an initial procedure.

Next, in the present embodiment, the initial procedure will be described using FIG. 14. In the present embodiment, each device performs the initial procedure to thereby change to a first state, and the UE_A 10 establishes a session via the core network_B 190. Hereinafter, the present procedure indicates the initial procedure, and procedures include the attach procedure, a PDN connectivity procedure, and the tracking area update procedure. Details of the procedures will be described later.

In the present procedure, each device first performs the attach procedure (S1400), and thereby the UE_A 10 changes to a state of connecting to the network. Next, each device performs the PDU session establishment procedure (S1402), to change to the first state (S1404). Each device may further perform the tracking area update procedure (S1404) after establishment of the PDU session but before the change to the first state. Note that each device may exchange various kinds of capability information and/or various kinds of request information of the devices in the attach procedure and/or the PDU session establishment procedure and/or the tracking area update procedure.

Note that in a case that each device performs exchange of various kinds of information and/or negotiation of various kinds of requests in the attach procedure, each device may not necessarily perform exchange of various kinds of information and/or negotiation of various kinds of requests in the PDU session establishment procedure. In a case that each device does not perform exchange of various kinds of information and/or negotiation of various kinds of requests in the attach procedure, on the other hand, each device may perform exchange of various kinds of information and/or negotiation of various kinds of requests in the PDU session establishment procedure. Without being limited to this, even in the case that each device performs exchange of various kinds of information and/or negotiation of various kinds of requests in the attach procedure, each device may perform exchange of various kinds of information and/or negotiation of various kinds of requests in the PDU session establishment procedure.

For example, in the attach procedure and the PDU session establishment procedure, the UE_A 10 may transmit one or more pieces of identification information among the first identification information, the tenth identification information, and the twenty-third identification information to the core network_B 190, and the core network_B 190 may receive the one or more pieces of identification information among the first identification information, the tenth identification information, and the twenty-third identification information from the UE_A 10 and further transmit one or more pieces of identification information among the fifth identification information to the eighth identification information and the twenty-sixth identification information to the twenty-eighth identification information to the UE_A 10.

The UE_A 10 may transmit one or more pieces of identification information among the first identification information, the tenth identification information, and the twenty-third identification information to the core network_B 190 in the attach procedure without transmitting the one or more pieces of identification information in the PDU session establishment procedure. Similarly, the core network_B 190 may transmit one or more pieces of identification information among the fifth identification information to the eighth identification information and the twenty-sixth identification information to the twenty-eighth identification information to the UE_A 10 in the attach procedure without transmitting the one or more pieces of identification information in the PDU session establishment procedure.

Instead, each device, the UE_A 10 may transmit one or more pieces of identification information among the first identification information, the tenth identification information, and the twenty-third identification information to the core network_B 190 in the PDU session establishment procedure without transmitting the one or more pieces of identification information in the attach procedure. Similarly, the core network_B 190 may transmit one or more pieces of identification information among the fifth identification information to the eighth identification information and the twenty-sixth identification information to the twenty-eighth identification information to the UE_A 10 in the PDU session establishment procedure without transmitting the one or more pieces of identification information in the attach procedure.

The UE_A 10 may transmit a piece(s) of identification information not transmitted in the attach procedure among the first identification information, the tenth identification information, and the twenty-third identification information, to the core network_B 190 in the Pall session establishment procedure. Similarly, the core network_B 190 may transmit a piece(s) of identification information not transmitted in the attach procedure among the fifth identification information to the eighth identification information and the twenty-sixth identification information to the twenty-eighth identification information, to the UE_A 10 in the PDU session establishment procedure.

Furthermore, in a case that these pieces of identification information are managed by being associated with the UE_A 10, each device may transmit and/or receive the pieces of identification information during the attach procedure; in a case that these pieces of identification information are managed by being associated with a PDU session and/or an EPS bearer, each device may transmit and/or receive the pieces of identification information during the PDU session establishment procedure.

Each device may perform the PDU session establishment procedure in the attach procedure or may perform the PDU session establishment procedure after completion of the attach procedure. Note that, in a case that the PDU session establishment procedure is performed in the attach procedure, each device may establish a PDU session or change to the first state, based on completion of the attach procedure.

Next, each device performs the tracking area update procedure (S1404). Note that the tracking area update procedure may be performed at an arbitrary timing before or after the change to the first state after the PDU session is established. Each device may exchange various kinds of request information in the tracking area update procedure. For example, in the tracking area update procedure, the UE_A 10 may transmit one or more pieces of identification information among the first identification information, the tenth identification information, and the twenty-third identification information to the core network_B 190. Moreover, the core network_B 190 may transmit one or more pieces of identification information among the fifth identification information to the ninth identification information and the twenty-sixth identification information to the twenty-eighth identification information to the UE_A 10.

Through the above-described procedures, each device completes the present procedure. Note that each device relating to the present procedure may transmit and/or receive each control message described in the present procedure, transmit and/or receive one or multiple pieces of identification information included in each control message, and store each piece of identification information thus transmitted and/or received as a context. Moreover, each device may change to an appropriate state, based on completion of the present procedure.

1.3.1. Overview of Attach Procedure

First, an overview of the attach procedure will be described. The attach procedure is a procedure initiated by the UE_A 10 to connect to the network (the access network and/or the core network_B 190 and/or the PDN_A 5). The UE_A 10 is able to perform the present procedure at an arbitrary timing, such as a time when the terminal is turned on, in a case that the UE_A 10 is not connected to the core network_B 190. In other words, the UE_A 10 may initiate the present procedure at an arbitrary timing in a case that the UE_A 10 is not registered (EMM-DEREGISTERED). Each device may change to a registered state (EMM-REGISTERED), based on completion the attach procedure.

1.3.2. Example of PDU Session Establishment Procedure

Next, an example of a PDU session establishment procedure will be described. Hereinafter, the present procedure indicates the PDN connectivity procedure. The present procedure is a procedure in which each device establishes a PDU session. Note that each device may perform the present procedure in a state where the attach procedure is completed or in the attach procedure. Each device may initiate the present procedure at an arbitrary timing after the attach procedure. Each device may establish a PDU session, based on completion of the PDU session establishment procedure. Each device may establish multiple PDU sessions by performing the present procedure multiple times.

1.3.2.1. Example of PDU Session Establishment Procedure

Figure 15:
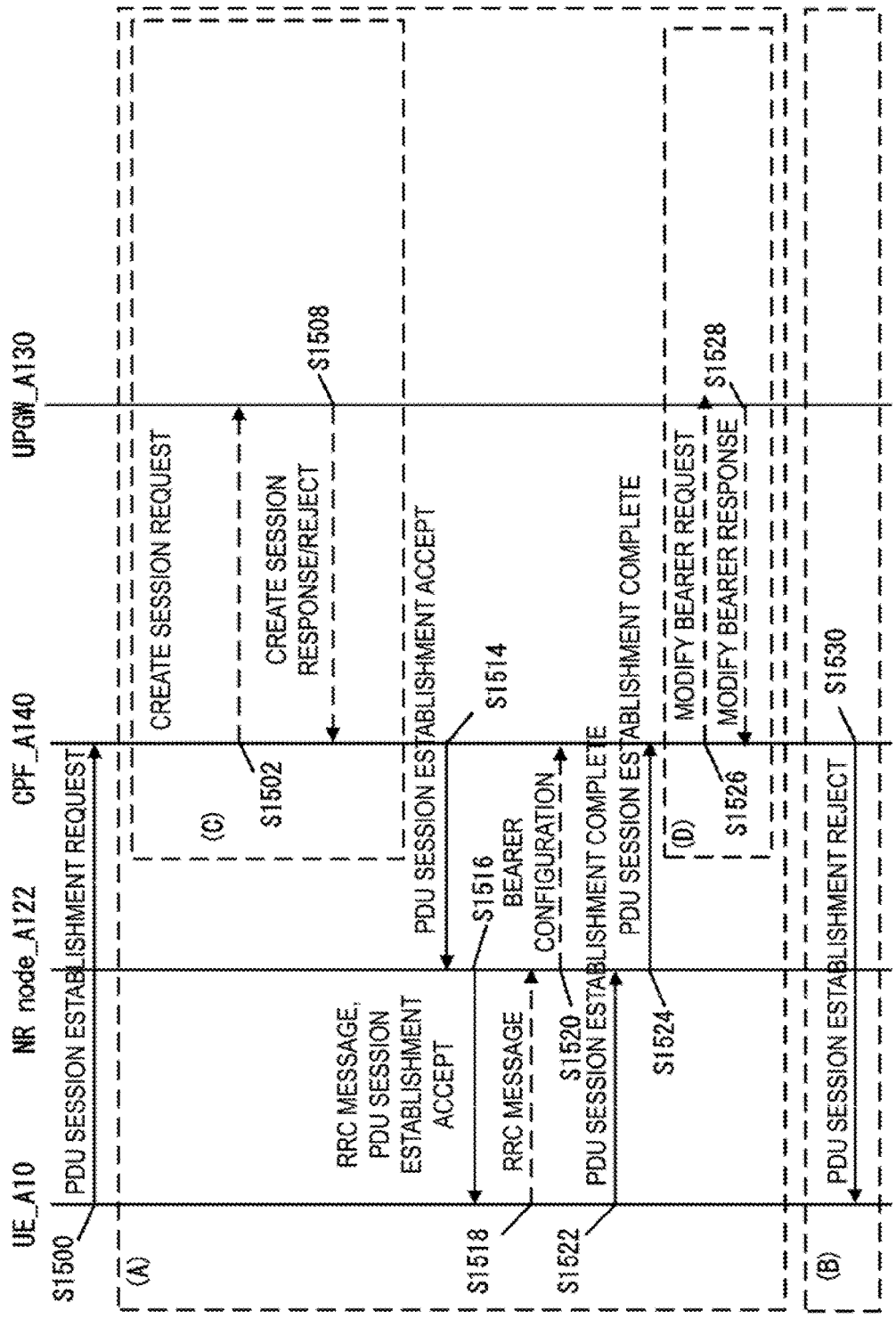
FIG. 15 is a diagram illustrating a PDU session establishment procedure.

By using FIG. 15, an example of steps for performing the PDU session establishment procedure will be described. Hereinafter, steps of the present procedure will be described. First, the UE_A 10 transmits a PDU Session Establishment Request message to the CPF_A 140 via the NR node_A 122 (S1500) to initiate the PDU session establishment procedure. Note that in a case that a PDU session is a PDN connection, the PDU session establishment request message may be a PUN connectivity request message. The PDU session establishment request message is not limited to this and may be any message for requesting establishment of a PDU session.

Specifically, the UE_A 10 transmits a Radio Resource Control message (RRC) including a Non-Access-Stratum (NAS) message including a PDU session establishment request message to the NR node_A 122. The NR node_A 122 that has received the RRC message including the NAS message including the PDU session establishment request message selects the CPF_A 140 as an NF or a common CP function of a routing destination of the NAS message including the PDU session establishment request message and transmits the NAS message including the PDU session establishment request message to the CPF_A 140. Here, the NR node_A 122 may select the NF or the common CP function of the routing destination, based on the tenth identification information included in the RRC message.

Here, the UE_A 10 may include at least one or more pieces of identification information of the first identification information, the tenth identification information, and the twenty-third identification information in the NAS message including the PDU session establishment request and/or the RRC message including the NAS message including the PDU session establishment request message, or may indicate a request of the UE_A 10 by including these pieces of identification information in the message(s). Also or alternatively, the UE_A 10 may include the twenty-third identification information in the PDU session establishment request message or may indicate a request of the UE_A 10 by including the identification information in the message.

Each device may indicate a slice type and/or a service type requested by the UE_A 10, may indicate a request for connection using a slice type and/or a service type already allowed by the network, or may indicate a common CP function to which the UE_A 10 requests to connect, to the NR node_A 122, by transmitting and/or receiving the first identification information and/or the tenth identification information. The NR node_A 122 may select the CPF_A 140, based on the first identification information and/or the tenth identification information included in the received RRC message.

Each device may indicate MO capability of the UE_A 10 by transmitting and/or receiving the twenty-third identification information and/or the twenty-first identification information. Moreover, each device may indicate that the UE_A 10 is capable of communication in MO mode or may indicate that the UE_A 10 is incapable of communication in MO mode by indicating the MO capability of the UE_A 10.

Each device may indicate MO capability of the UE_A 10, may indicate that the UE_A 10 requests communication in MO mode, or may indicate both by transmitting and/or receiving the twenty-third identification information and/or the twenty-second identification information. Moreover, each device may indicate that the UE_A 10 is capable of communication in MO mode or may indicate that the UE_A 10 is incapable of communication in MO mode by indicating the MO capability of the UE_A 10.

The CPF_A 140 receives the PDU session establishment request message and performs a first condition determination. The first condition determination is to determine whether or not the CPF_A 140 accepts a request of the UE_A 10. In the first condition determination, the CPF_A 140 determines whether a first condition is true or false. In a case that the first condition is true, the CPF_A 140 initiates a procedure (A) in the present procedure; in a case that the first condition is false, the CPF_A 140 initiates a procedure (B) in the present procedure. Note that steps in the case that the first condition is false will be described later.

Hereinafter, steps in the case that the first condition is true, specifically, steps in the procedure (A) in the present procedure, will be described. The CPF_A 140 selects an NSI and/or the UPGW_A 130 to connect to, based on the received first identification information and/or tenth identification information, performs a procedure (C) in the present procedure, and initiates the procedure (A) in the present procedure. Steps in the procedure (C) in the present procedure will be further described. The CPF_A 140 transmits a create session request message to the selected UPGW_A 130 or the UPGW_A 130 associated with the selected NSI and initiates the procedure (C) in the present procedure (S1502).

Here, the CPF_A 140 may include at least one or more pieces of identification information of the x-th identification information to the x-th identification information in the create session request message, may include information indicating whether or not this is an initial request, or may transmit a request of the UE_A 10 by including the piece(s) of identification information in the message.

The UPGW_A 130 receives the create session request message and performs a third condition determination. Note that the third condition determination is to determine whether or not the UPGW_A 130 accepts a request of the UE_A 10. The third condition being true may refer to a case that the UPGW_A 130 accepts the request of the UE_A 10, in other words, a case that the request of the UE_A 10 is allowed. The third condition being false may refer to a case that the UPGW_A 130 rejects the request of the UE_A 10, in other words, a case that the third condition is not determined to be true.

The third condition determination may be performed by another device (e.g., the PCRF_A 60) instead of the UPGW_A 130. In this case, the UPGW_A 130 performs an IP-CAN session establishment procedure with the PCRF_A 60. More specifically, the UPGW_A 130 transmits a request message in the IP-CAN session establishment procedure to the PCRF_A 60. The PCRF_A 60 receives the request message in the IP-CAN session establishment procedure, makes determination about the third condition, and transmits a response message in the IP-CAN session establishment procedure to the UPGW_A 130. The UPGW_A 130 receives the response message in the IP-CAN session establishment procedure and recognizes a result of the third condition determination.

Here, the UPGW_A 130 may include at least one or more pieces of identification information of the first identification information, the tenth identification information, and the twenty-third identification information in a request message in the IP-CAN session establishment procedure, or may transmit the request of the UE_A 10 by including the piece(s) of identification information in the message.

The PCRF_A 60 may include at least the result of the third condition determination in the response message in the IP-CAN session establishment procedure, or may notify the UPGW_A 130 of the result of the third condition determination by including the result in the message.

The PCRF_A 60 may include the twenty-sixth identification information in the response message in the IP-CAN session establishment procedure or may indicate that the request of the UE_A 10 is allowed by including the piece(s) of identification information in the message.

Note that in a case that the PCRF_A 60 has performed the third condition determination, the UPGW_A 130 may perform the third condition determination, based on the result of the third condition determination received from the PCRF_A 60. For example, in a case that the PCRF_A 60 accepts the request of the UE_A 10, the PCRF_A 60 and the UPGW_A 130 may determine that the third condition is true; in a case that the PCRF_A 60 rejects the request of the UE_A 10, the PCRF_A 60 and the UPGW_A 130 may determine that the third condition is false.

In the third condition determination, the UPGW_A 130 determines whether the third condition is true or false. In a case that the third condition is true, the UPGW_A 130 transmits a create session response message to the CPF_A 140 (S1506). The CPF_A 140 receives the create session response message.

In a case that the third condition is false, the UPGW_A 130 transmits a create session reject message to the CPF_A 140 (S1508), Note that the create session reject message may be a create session response message including a Reject cause.

Each device completes the procedure (C) in the present procedure, based on transmission and/or reception of the create session response message and/or the create session reject message.

The CPF_A 140 transmits a PDU session establishment accept message to the NR node_A 122, based on reception of the create session response message (S1514). Note that in a case that the CPF_A 140 has received the create session reject message, the CPF_A 140 may initiate the procedure (B) in the present procedure without continuing the procedure (A) in the present embodiment. In a case that a PDU session is a PDN connection, the PDU session establishment accept message may be a PDN Connectivity Accept message or may be an Activate default EPS bearer context request message. The PDU session establishment request message may be any response message to the PDU session establishment request message and may be, without being limited to the above, any message accepting a request of a PDU session.

The NR node_A 122 receives the PDU session establishment accept message and transmits an RRC message (e.g., an RRC message, such as an RRC Connection Reconfiguration message, an RRC Connection Setup message, or an RRC Direct Transfer message) and/or a PDU session establishment accept message to the UE_A 10 (S1516). Note that the PDU session establishment accept message may be transmitted and/or received in the RRC message.

Here, the CPF_A 140 may include the twenty-sixth identification information or may include an IP address in the PDU session establishment accept message, or may indicate that the request of the UE_A 10 is accepted by including these pieces of identification information in the message.

Each device may indicate MO capability of the network by transmitting and/or receiving the twenty-sixth identification information and/or the twenty-fourth identification information. Moreover, each device may indicate that the network is capable of communication in MO mode or may indicate that the UE_A 10 is incapable of communication in MO mode by indicating the MO capability of the network.

In other words, in a case that MO capability of the network indicated by the twenty-fourth identification information indicates that the network is capable of communication in MO mode, it may be indicated that the network has data buffering capability. In a case that MO capability of the network indicated by the twenty-fourth identification information indicates that the network is incapable of communication in mode, it may be indicated that the network does not have data buffering capability, in other words, is incapable of data buffering.

Each device may further indicate MO capability of the network, may indicate that the network allows communication in MO mode, or may indicate both by transmitting and/or receiving the twenty-sixth identification information and/or the twenty-fifth identification information. Moreover, each device may indicate that the network is capable of communication in MO mode or may indicate that the network is incapable of communication in MO mode by indicating the MO capability of the network.

In a case of receiving the RRC message, the UE_A 10 transmits an RRC message (e.g., an RRC message, such as an RRC Connection Reconfiguration Complete message, an RRC Connection Setup Complete message, or an RRC Direct Transfer message) to the NR node_A 122 (S1518). The NR node_A 122 receives the RRC message and transmits a bearer configuration message to the CPF_140 (S1520). Furthermore, the CPF_A 140 receives the bearer configuration message.

In a case of receiving a PDU session establishment accept message, the UE_A 10 transmits a PDU session establishment complete message to the CPF_A 140 via the NR node_A 122 (S1522) (S1524). The CPF_A 140 receives the PDU session establishment complete message and performs a second condition determination. Note that in a case that the PDU session is a PDN connection, the PDU session establishment complete message may be a PDN Connectivity complete message or may be an Activate default EPS bearer context accept message. The PDU session establishment complete message may be any response message to the PDU session establishment accept message and may be, without being limited to the above, any message indicating completion of the PDU session establishment procedure.

The second condition determination is for the CPF_A 140 to determine whether or not it is necessary to request the UPGW_A 130 to modify a bearer. In a case that the second condition is true, the CPF_A 140 initiates a procedure (D) in the present procedure. In a case that the second condition determination is false, the CPF_A 140 does not perform the procedure (D) in the present procedure. Steps in the procedure (D) in the present procedure will be described below. In a case that the second condition is true, the CPF_A 140 transmits a modify bearer request message to the SGW_A 35 (S1526) and initiates the procedure (D) in the present procedure. The SGW_A 35 receives the modify bearer request message and transmits a modify bearer response message to the CPF_A 140 (S1528). Furthermore, the CPF_A 140 receives the modify bearer response message and completes the procedure (D) in the present procedure. Each device completes the procedure (A) in the present procedure, based on transmission and/or reception of the PDU session establishment complete message in the case that the second condition determination is false and/or based on completion of the procedure (D)) in the present procedure in the case that the second condition determination is true.

Next, steps in the procedure (B) in the present procedure will be described. The CPF_A 140 transmits a PDU session establishment reject message to the UE_A 10 via the NR node_A 122 (S1530) to initiate the procedure (B) in the present procedure. The UE_A 10 receives the PDU session establishment reject message and recognizes that the request of the UE_A 10 has been rejected. Each device completes the procedure (B) in the present procedure, based on transmission and/or reception of the PDU session establishment reject message. The PDU session establishment reject message may include an appropriate reject cause. Note that in a case that the PDU session is a PDN connection, the PDU session establishment reject message may be a PDN Connectivity reject message. The PDU session establishment reject message may be any response message to the PDU session establishment request message and may be, without being limited to the above, any message rejecting the request of establishment of the PDU session.

Each device completes the present procedure, based on completion of the procedure (A) or (B) in the present procedure. Note that each device may change to a state in which a PDU session is established, based on completion of the procedure (A) in the present procedure, or may recognize that the present procedure is rejected or may change to a state in which a PDU session is not established, based on completion of the procedure (B) in the present procedure.

Moreover, each device may perform processing based on identification information transmitted and/or received in the present procedure, based on completion of the present procedure. For example, in a case that each device receives the twenty-sixth identification information and also in a case that the twenty-sixth identification information includes information indicating that the network is incapable of communication in MO mode and/or information indicating that the network does not allow communication in MO mode, the UE_A 10 does not perform communication in MO mode after establishment of the PDU session.

The above-described first to third condition determinations may be performed based on identification information included in the PDU session establishment request message and/or subscriber information and/or an operator policy. Conditions for determination of whether each of the first to third conditions is true or false may not necessarily be limited to the above-described conditions.

For example, the first condition and/or the third condition may be true in a case that the UE_A 10 requests establishment of a session and the network allows the request. The first condition and/or the third condition may be false in a case that the UE_A 10 requests establishment of a session and the network does not allow the request. Moreover, the first condition and/or the third condition may be false in a case that a network that is a connection destination of the UE_A 10 and/or any device in the network does not support establishment of the session requested by the UE_A 10.

1.3.3. Example of Attach Procedure

Figure 16:
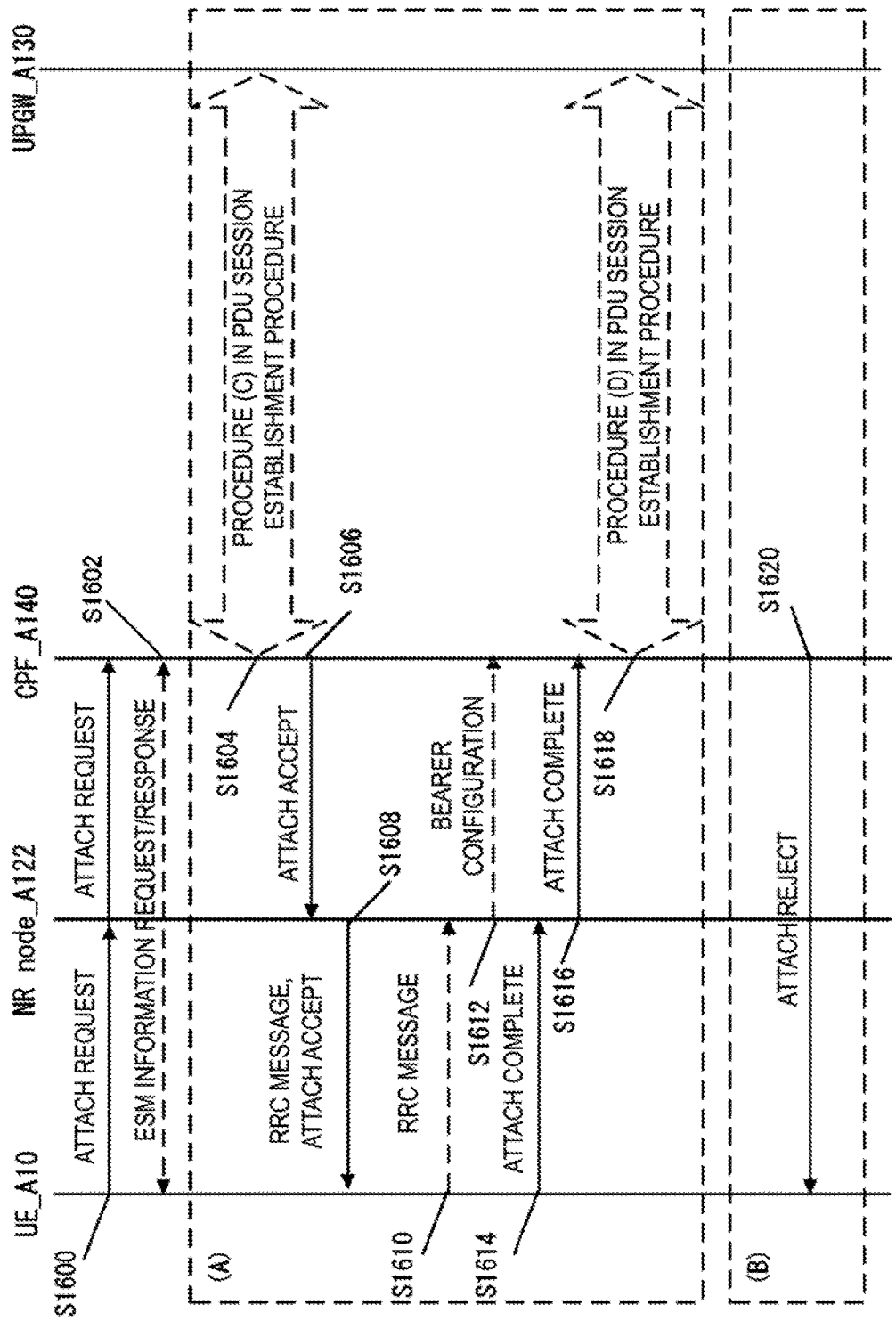
FIG. 16 is a diagram illustrating an attach procedure.

An example of steps of the attach procedure will be described using FIG. 16. Hereinafter, the present procedure indicates the attach procedure. The present procedure is a procedure in which the UE_A 10 is registered in the core network_B 190. Hereinafter, steps of the present procedure will be described. First, the UE_A 10 transmits an Attach request message to the CPF_A 140 via the NR node_A 122 (S1600) to initiate the attach procedure. The UE_A 10 may transmit the above-described PDU session establishment request message in the attach request message or may request to perform the PDU session establishment procedure in the attach procedure by including the PDU session establishment request message in the attach request message.

Specifically, the UE_A 10 transmits an RRC message including an attach request message to the NR node_A 122. The NR node_A 122 that has received the RRC message including the attach request message selects the CPF_A 140 as an NF or a common CP function of a routing destination of the attach request message and transmits the attach request message to the CPF_A 140. Here, the NR node_A 122 may select the NF or the common CP function of the routing destination, based on the tenth identification information included in the RRC message. The attach request message may be a NAS message.

Note that the UE_A 10 may transmit one or more attach request messages for each network slice for which the UE_A 10 requests to connect, in one RRC message, and multiple attach request messages may be referred to as an attach request message collectively. Alternatively, the UE_A 10 may transmit an attach request message for each NSI to which the UE_A 10 requests to connect, in an RRC message.

Here, the UE_A 10 may include at least one or more pieces of identification information of the first identification information, the tenth identification information, and the twenty-third identification information in an attach request message and/or an RRC message, or may indicate a request of the UE_A 10 by including these pieces of identification information in the message(s).

Each device may indicate a slice type and/or a service type requested by the UE_A 10, may indicate a request for connection using a slice type and/or a service type already allowed by the network, or may indicate a common CP function to which the UE_A 10 requests to connect, to the NR node_A 122, by transmitting and/or receiving the first identification information and/or the tenth identification information. The NR node_A 122 may select the CPF_A 140, based on the first identification information and/or the tenth identification information included in the received RRC message.

Each device may indicate MO capability of the UE_A 10 by transmitting and/or receiving the twenty-third identification information and/or the twenty-first identification information. Moreover, each device may indicate that the UE_A 10 is capable of communication in MO mode or may indicate that the UE_A 10 is incapable of communication in MO mode by indicating the MO capability of the UE_A 10.

Each device may indicate MO capability of the UE_A 10, may indicate that the UE_A 10 requests communication in MO mode, or may indicate both by transmitting and/or receiving the twenty-third identification information and/or the twenty-second identification information. Moreover, each device may indicate that the UE_A 10 is capable of communication in MO mode or may indicate that the UE_A 10 is incapable of communication in MO mode by indicating the MO capability of the UE_A 10.

Note that the UE_A 10 may transmit these pieces of identification information in a control message different from an attach request message.

The CPF_A 140 receives the attach request message and/or the control message different from an attach request message and performs a first condition determination. In a case that the first condition is true, the CPF_A 140 initiates a procedure (A) in the present procedure; in a case that the first condition is false, the CPF_A 140 initiates a procedure (B) in the present procedure.

Steps in the procedure (A) in the present procedure will be described below. The CPF_A 140 performs a fourth condition determination to initiate the procedure (A) in the present procedure. In the fourth condition determination, the CPF_A 140 determines whether a fourth condition is true or false. In a case that the fourth condition is true, the CPF_A 140 selects an NSI and/or the UPGW_A 130 to connect to, based on the received first identification information and/or tenth identification information, and performs the procedure (C) in the PDU session establishment procedure; in a case that the fourth condition is false, these procedures are omitted (S1604). The CPF_A 140 transmits an Attach accept message to the NR node_A 122, based on reception of the attach request message and/or a create session response message and/or completion of the procedure (C) in the PDN connectivity procedure (S1606). Note that in a case that the CPF_A 140 has received the create session reject message, the CPF_A 140 may initiate the procedure (B) in the present procedure without continuing the procedure (A) in the present procedure. Here, the CPF_A 140 may transmit an attach accept message to the NR node_A 122 in a S1AP message (e.g., an Initial context setup request or Downlink NAS Transport). The attach accept message may be a NAS message.

The NR node_A 122 receives the attach accept message and transmits an RRC message (e.g., an RRC message, such as an RRC Connection Reconfiguration message, an RRC Connection Setup message, or an RRC Direct Transfer message)) and/or an attach accept message to the UE_A 10 (S1608). Note that the attach accept message may be transmitted and/or received in the RRC message. In a case that the fourth condition is true, the CPF_A 140 may transmit the above-described PDU session establishment accept message in the attach accept message or may indicate that the PDU session establishment procedure is accepted, by including the PDU session establishment accept message in the attach accept message.

Here, the CPF_A 140 may include at least one or more pieces of identification information of the fifth identification information to the eighth identification information and the twenty-sixth identification information to the twenty-eighth identification information in the attach accept message and/or the S1AP message, may include an IP address in the message(s), or may indicate that a request of the UE_A 10 is accepted, by including these pieces of identification information in the message(s). The NR node_A 122 may include the fifth identification information to the eighth identification information and the twenty-sixth identification information to the twenty-eighth identification information in an RRC message, or may indicate that a request of the UE_A 10 is accepted, by including s pieces of identification information in the message.

Each device may indicate one or multiple NSIs and/or services allowed by the network or may indicate temporary UE identification information assigned to the UE_A 10 by the network, by transmitting and/or receiving the fifth identification information. Each device may indicate a value to be set in a timer for managing available time of the fifth identification information by transmitting and/or receiving the sixth identification information.

Specifically, for example, in a case that the second identification information is included in the fifth identification information, the sixth identification information may indicate time in which the second identification information is available and/or available time in which connection to the NSI indicated by the second identification information is allowed. In a case that the third identification information is included in the fifth identification information, the sixth identification information may indicate time in which the third identification information is available and/or available time in which connection to the CCNF and/or the NSI indicated by the third identification information is allowed.

In a case that the fourth identification information is included in the fifth identification information, the sixth identification information may indicate time in which the fourth identification information is available Each device may indicate that the UE_A 10 is requested to initiate the timer by using the value indicated by the sixth identification information, by transmitting and/or receiving the sixth identification information.

Each device may indicate that restriction is imposed on a connection to a specific one(s) and/or part of and/or all the NSIs among connections to one or more NSIs that the UE_A 10 is allowed by the network or may indicate one or more NSIs for which a connection is restricted, by transmitting and/or receiving the seventh identification information.

Each device may indicate that a connection to a specific one(s) and/or part of and/or all the NSIs among connections to one or more NSIs that the network is requested by the UE_A 10 is allowed or may indicate one or more NSIs for which connection is allowed, by transmitting and/or receiving the eighth identification information.

Each device may further indicate that the network has allowed the request from the UE_A 10, by transmitting and/or receiving one or more of the fifth identification information to the eighth identification information.

Each device may indicate MO capability of the network by transmitting and/or receiving the twenty-sixth identification information and/or the twenty-fourth identification information. Moreover, each device may indicate that the network is capable of communication in MO mode or may indicate that the UE_A 10 is incapable of communication in MO mode by indicating the MO capability of the network.

In other words, in a case that MO capability of the network indicated by the twenty-fourth identification information indicates that the network is capable of communication in MO mode, it may be indicated that the network has data buffering capability. In a case that MO capability of the network indicated by the twenty-fourth identification information indicates that the network is incapable of communication in MO mode, it may be indicated that the network does not have data buffering capability, in other words, is incapable of data buffering.

Each device may further indicate MO capability of the network, may indicate that the network allows communication in MO mode, or may indicate both by transmitting and/or receiving the twenty-sixth identification information and/or the twenty-fifth identification information. Moreover, each device may indicate that the network is capable of communication in MO mode or may indicate that the network is incapable of communication in MO mode by indicating the MO capability of the network.

Each device may indicate that the UE_A 10 is located in the area in which restriction is imposed on communication in MO mode, by transmitting and/or receiving the twenty-seventh identification information. Each device may indicate that the UE_A 10 is located in the area in which communication in MO mode is allowed, by transmitting and/or receiving the twenty-eighth identification information.

Here, the first condition determination may be the same as the first condition determination in the PDU session establishment procedure. The fourth condition determination is to determine whether or not the CPF_A 140 performs the PDU session establishment procedure. The fourth condition being true refers to a case of receiving a PDU session establishment request message or a case of also performing the PDU session establishment procedure in the present procedure. The fourth condition being false refers to a case of not receiving a PDU session establishment request message, a case of not performing the PDU session establishment procedure in the present procedure, or a case of not determining that the fourth condition is true.

In a case that the UE_A 10 has received an RRC message from the NR node_A 122, the UE_A 10 transmits an RRC connection message (e.g., an RRC message, such as an RRC Connection Reconfiguration Complete message, an RRC Connection Setup Complete message, or an RRC Direct Transfer message) to the NR node_A 122 (S1610). The NR node_A 122 receives the RRC message and transmits a bearer configuration message to the CPF_140 (S1612). Furthermore, the CPF_A 140 receives the bearer configuration message.

In a case that the UE_A 10 has received an attach accept message from the CPF_A 140 via the NR node_A 122, the UE_A 10 transmits an Attach complete message to the CPF_A 140 via the NR node_A 122 (S1614) (S1616). The CPF_A 140 receives the attach complete message. In a case that the fourth condition is true, the CPF_A 140 performs a second condition determination. The second condition determination is for the CPF_A 140 to determine whether or not it is necessary to request the UPGW_A 130 to modify a bearer. In a case that the second condition is true, the CPF_A 140 initiates and performs the procedure (D) in the PDU session establishment procedure (S1618). Each device completes the procedure (A) in the present procedure, based on transmission and/or reception of the attach complete message and/or based on completion of the procedure (D) in the PDU session establishment procedure.

Note that in a case that the UE_A 10 has received the PDU session establishment accept message, the UE_A 10 may transmit the above-described PDU session establishment complete message in the attach complete message, or may indicate that the PDU session establishment procedure is completed by including the PDU session establishment complete message in the attach complete message. The UE_A 10 may start the first timer in which a value indicated by the sixth identification information is set, by transmitting the attach complete message.

Next, steps in the procedure (B) in the present procedure will be described. The CPF_A 140 transmits an Attach reject message to the UE_A 10 via the NR node_A 122 to initiate the procedure (B) in the present procedure (S1620). The UE_A 10 receives the attach reject message and recognizes that the request of the UE_A 10 has been rejected. Each device completes the procedure (B) in the present procedure, based on transmission and/or reception of the attach reject message. Note that in a case that the fourth condition is true, the CPF_A 140 may transmit the above-described PDU session establishment reject message in the attach reject message or may indicate that the PDU session establishment procedure is rejected, by including the PDU session establishment reject message in the attach reject message. In this case, the UE_A 10 may further receive the PDU session establishment reject message or may confirm that the PDU session establishment procedure has been rejected.

Each device completes the present procedure, based on completion of the procedure (A) or (B) in the present procedure. Note that each device may change to a state in which the UE_A 10 is connected to the network and/or the registered state, based on completion of the procedure (A) in the present procedure, or may recognize that the present procedure is rejected or may change to a state in which the UE_A 10 is not able to connect to the network, based on completion of the procedure (B) in the present procedure. Change of each device to each state may be performed based on completion of the present procedure or may be performed based on establishment of a PDU session.

Moreover, each device may perform processing based on identification information transmitted and/or received in the present procedure, based on completion of the present procedure. For example, in a case that the UE_A 10 has received the fifth identification information and the sixth identification information, the UE_A 10 sets the value indicated by the sixth identification information, in the first timer configured to count availability information of the fifth identification information, to further start counting by the first timer at the time of receiving an attach accept message or the time of transmitting an attach complete message. In a case that the first timer expires or a case that configuration of the UE_A 10 is updated by a configuration update procedure, the counting by the first timer is stopped. Details of the configuration update procedure will be described in Section 1.4.

In a case that the network has transmitted the fifth identification information and the sixth identification information, the network may appropriately configure a value in the second timer configured to count expiry of the fifth identification information in the network, to then start the second timer. Alternatively, the network may appropriately configure and start the second timer, based on reception of an attach complete message from the UE_A 10. In a case that the second timer expires or a case that configuration of the network is updated by the configuration update procedure, the counting by the second timer is stopped. Details of the configuration update procedure will be described in Section 1.4.

In a case that the UE_A 10 has received the seventh identification information, the UE_A 10 does not establish a connection to a specified NSI while the UE_A 10 is located in the area indicated by the seventh identification information. For example, in a case that the UE_A 10 has received the eighth identification information, a specified NSI maintains an established connection while the UE_A 10 is located in the area indicated by the eighth identification information.

In a case that the UE_A 10 has received the twenty-sixth identification information and also that the twenty-sixth identification information is information including information indicating that the network is incapable of communication in MO mode and/or information indicating that the network does not allow communication in MO mode, or the twenty-sixth identification information is information indicating the meaning of above information, the UE_A 10 performs, after establishment of a PDU session, communication in the normal mode, receives paging from the network, and performs a periodic tracking area update procedure.

In a case that the UE_A 10 has received the twenty-sixth identification information and also that the twenty-sixth identification information is information including information indicating that the network is capable of communication in MO mode and/or information indicating that the network allows communication in MO mode, or the twenty-sixth identification information is information indicating the meaning of above information, the UE_A 10 performs, after establishment of a PDU session, communication in MO mode, and stops receiving paging from the network and initiating the periodic tracking area update procedure.

After completion of the present procedure, the UE_A 10 may initiate the tracking area update procedure, based on the mode to which the UE_A 10 has changed. In other words, in a case that restriction has been imposed on MO mode through the present procedure, the UE_A 10 may initiate the tracking area update procedure to change to MO mode.

Note that the UE_A 10 may initiate the tracking area update procedure after completion of the present procedure, without being limited to the above. For example, the UE_A 10 may initiate the tracking area update procedure, based on expiry of the first timer.

The above-described first to fourth condition determinations may be performed based on identification information included in the attach request message and/or subscriber information and/or an operator policy. Conditions for determination of whether each of the first to fourth conditions is true or false may not necessarily be limited to the above-described conditions.

For example, the first condition determination and/or the third condition determination may be similar to the above-described example of the PDU session establishment procedure.

1.3.4. Overview of Tracking Area Update Procedure

An overview of the Tracking Area Update Procedure will be described. Hereinafter, the present procedure indicates the tracking area update procedure. The present procedure is a procedure for updating location registration information of the UE_A 10 in a network (the access network and/or the core network_B 190) and/or for the UE_A 10 to periodically notify the network of a state of the UE_A 10 and/or for updating a particular parameter relating to the UE_A 10 in the network. The UE_A 10 is able to perform the present procedure at an arbitrary timing, in a state that a PDU session has been established. The UE_A 10 is able to periodically perform the present procedure.

1.3.4.1. Example of Tracking Area Update Procedure

Figure 17:
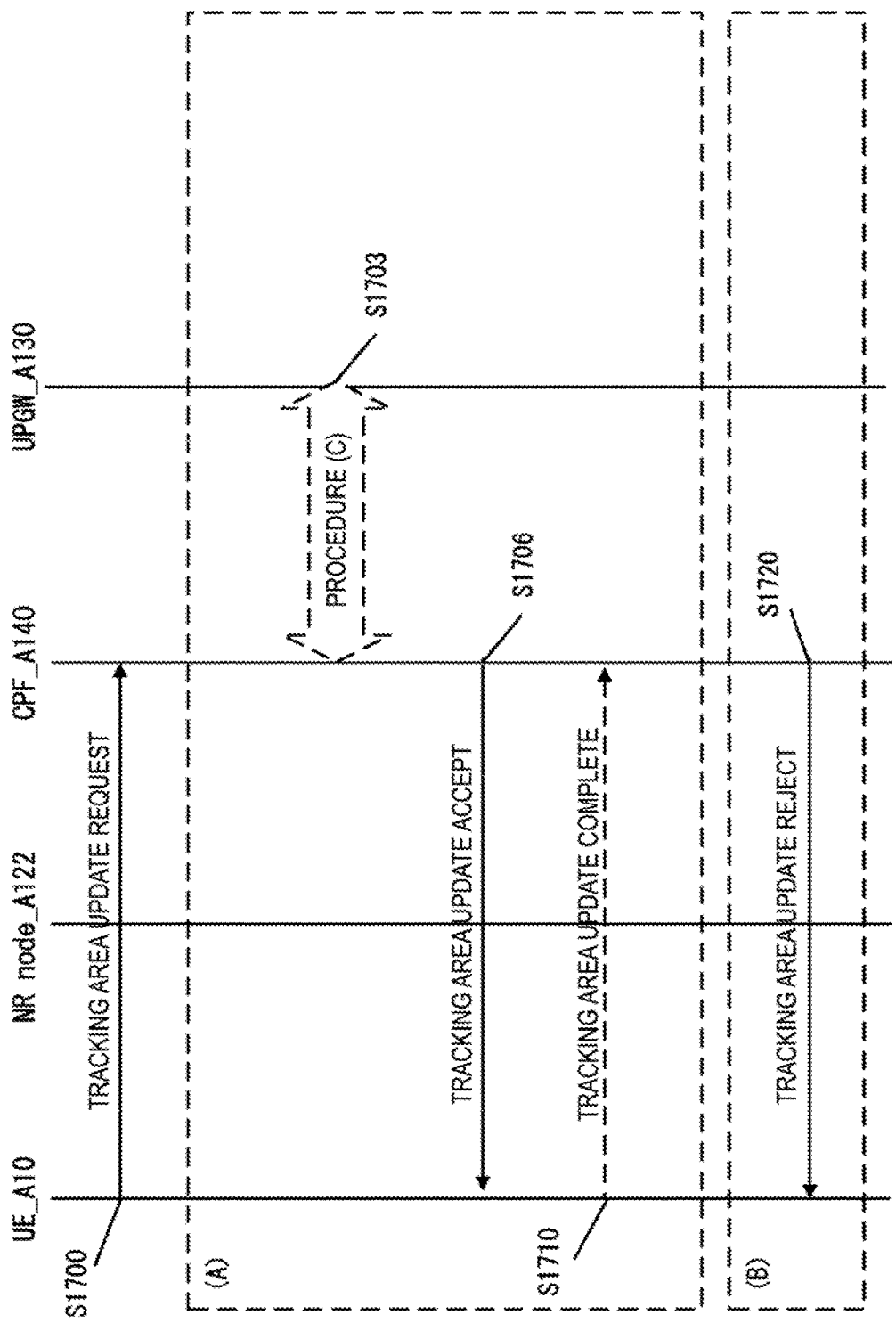
FIG. 17 is a diagram illustrating a tracking area update procedure.

An example of steps of the tracking area update procedure will be described using FIG. 17. Hereinafter, steps of the present procedure will be described. First, the UE_A 10 transmits a Tracking Area Update request message to the CPF_A 140 via the NR node_A 122 (S1700) to initiate the tracking area update procedure.

Specifically, the UE_A 10 transmits an RRC message including a tracking area update request message to the NR node_A 122. The NR node_A 122 that has received the RRC message including the tracking area update request message selects the CPF_A 140 as an NF or a common CP function of a routing destination of the tracking area update request message and transmits an attach request message to the CPF_A 140. Here, the NR node_A 122 may select the NF or the common CP function of the routing destination, based on the tenth identification information included in the RRC message. The tracking area update request message may be a Non-Access-Stratum (NAS) message.

Here, the UE_A 10 may include at least one or more pieces of identification information of the first identification information, the tenth identification information, and the twenty-third identification information in the tracking area update request message and/or the RRC message, or may indicate a request of the UE_A 10 by including these pieces of identification information in the message(s).

Each device may indicate a slice type and/or a service type requested by the UE_A 10, may indicate a request for connection using a slice type and/or a service type already allowed by the network, or may indicate a common CP function to which the UE_A 10 requests to connect, to the NR node_A 122, by transmitting and/or receiving the first identification information and/or the tenth identification information. The NR node_A 122 may select the CPF_A 140, based on the first identification information and/or the tenth identification information included in the received RRC message.

Each device may indicate MO capability of the UE_A 10 by transmitting and/or receiving the twenty-third identification information and/or the twenty-first identification information. Moreover, each device may indicate that the UE_A 10 is capable of communication in MO mode or may indicate that the UE_A 10 is incapable of communication in MO mode by indicating the MO capability of the UE_A 10.

Each device may indicate MO capability of the UE_A 10, may indicate that the UE_A 10 requests communication in MO mode, or may indicate both by transmitting and/or receiving the twenty-third identification information and/or the twenty-second identification information. Moreover, each device may indicate that the UE_A 10 is capable of communication in MO mode or may indicate that the UE_A 10 is incapable of communication in MO mode by indicating the MO capability of the UE_A 10.

The CPF_A 140 receives the tracking area update request message and performs a first condition determination. In the first condition determination, the CPF_A 140 determines whether a first condition is true or false. In a case that the first condition is true, the CPF_A 140 initiates a procedure (A) in the present procedure; in a case that the first condition is false, the CPF_A 140 initiates a procedure (B) in the present procedure. Note that steps in the case that the first condition is false will be described later.

Hereinafter, steps in the case that the first condition is true, specifically, steps in the procedure (A) in the present procedure, will be described. The CPF_A 140 performs a fourth condition determination to initiate the procedure (A) in the present procedure. In the fourth condition determination, the CPF_A 140 determines whether a fourth condition is true or false. In a case that the fourth condition is true, the CPF_A 140 selects an NSI and/or the UPGW_A 130 to connect to, based on the received first identification information and/or tenth identification information, initiates a procedure (C) in the present procedure; in a case that the fourth condition is false, these procedures are omitted (S1703).

Here, the first condition determination may be the same as the first condition determination in the attach procedure. The fourth condition determination is to determine whether or not a procedure for a change and/or addition and/or deletion of a PDU session is necessary.

Here, the CPF_A 140 may include at least one or more pieces of identification information of the 1x-th identification information and the tenth identification information in a message in the procedure (C) in the present procedure, or may transmit the request of the UE_A 10 to each device by including these pieces of identification information in the message.

After completion of the procedure (C), the CPF_A 140 further performs a third condition determination. Here, the third condition determination is to determine whether or not the CPF_A 140 accepts the request of the UE_A 10. The third condition determination may be determined based on information received from any of the devices in the procedure (C). In the third condition determination, the CPF_A 140 determines whether a third condition is true or false.

In a case that the third condition is true in the procedure (C) in the present procedure, the CPF_A 140 transmits a Tracking Area Update accept message to the UE_A 10 via the NR node_A 122 (S1706); in a case that the third condition is false, the CPF_A 140 initiates the procedure (B) in the present procedure. The tracking area update accept message may include an appropriate accept cause. Note that the tracking area update accept message may be any response message to the tracking area update request message and may be, without being limited to the above, any message accepting a request of tracking area update.

Here, the CPF_A 140 may transmit the tracking area update accept message to the NR node_A 122 in an S1AP message (e.g., a UE Context Modification Request or Downlink NAS Transport). The tracking area update accept message may be a NAS message. The NR node_A 122 may transmit the received tracking area update accept message to the UE_A 10 in the RRC message.

Here, the CPF_A 140 may include at least one or more pieces of identification information of the fifth identification information to the ninth identification information and the twenty-sixth identification information to the twenty-eighth identification information in the tracking area update accept message and/or the S1AP message, or may indicate that a request of the UE_A 10 is accepted, by including these pieces of identification information in the message(s). The NR node_A 122 may include one or more pieces of identification information among the fifth identification information to the ninth identification information and the twenty-sixth identification information to the twenty-eighth identification information in an RRC message, or may indicate that a request of the UE_A 10 is accepted, by including these pieces of identification information in the message.

Each device may indicate one or multiple NSIs and/or services allowed by the network or may indicate temporary UE identification information assigned to the UE_A 10 by the network, by transmitting and/or receiving the fifth identification information. Each device may indicate a value to be set in a timer for managing available time of the fifth identification information by transmitting and/or receiving the sixth identification information.

Specifically, for example, in a case that the second identification information is included in the fifth identification information, the sixth identification information may indicate time in which the second identification information is available and/or available time in which connection to the NSI indicated by the second identification information is allowed. In a case that the third identification information is included in the fifth identification information, the sixth identification information may indicate time in which the third identification information is available and/or available time in which connection to the CCNF and/or the NSI indicated by the third identification information is allowed.

In a case that the fourth identification information is included in the fifth identification information, the sixth identification information may indicate time in which the fourth identification information is available. Each device may indicate that the UE_A 10 is requested to initiate the timer by using the value indicated by the sixth identification information, by transmitting and/or receiving the sixth identification information.

Each device may indicate that restriction is imposed on a connection to a specific one(s) and/or part of and/or all the NSIs among connections to one or more NSIs that the UE_A 10 is allowed by the network or may indicate one or more NSIs for which a connection is restricted, by transmitting and/or receiving the seventh identification information. Each device may indicate that a connection to a specific one(s) and/or part of and/or all the NSIs among connections to one or more NSIs that the network is requested by the UE_A 10 is allowed or may indicate one or more NSIs for which connection is allowed, by transmitting and/or receiving the eighth identification information. Each device may indicate a TA list of TAs to which the network allows the UE_A 10 to connect, and further store the TA list by transmitting and/or receiving the ninth identification information. Note that each device may store the TA list and an NSI(s) in association with each other.

Each device may further indicate that the network has allowed the request from the UE_A 10, by transmitting and/or receiving one or more of the fifth identification information to the ninth identification information.

Each device may indicate MO capability of the network by transmitting and/or receiving the twenty-sixth identification information and/or the twenty-fourth identification information. Moreover, each device may indicate that the network is capable of communication in MO mode or may indicate that the UE_A 10 is incapable of communication in MO mode by indicating the MO capability of the network.

In other words, in a case that MO capability of the network indicated by the twenty-fourth identification information indicates that the network is capable of communication in MO mode, it may be indicated that the network has data buffering capability. In a case that MO capability of the network indicated by the twenty-fourth identification information indicates that the network is incapable of communication in MO mode, it may be indicated that the network does not have data buffering capability, in other words, is incapable of data buffering.

Each device may further indicate MO capability of the network, may indicate that the network allows communication in MO mode, or may indicate both by transmitting and/or receiving the twenty-sixth identification information and/or the twenty-fifth identification information. Moreover, each device may indicate that the network is capable of communication in MO mode or may indicate that the network is incapable of communication in MO mode by indicating the MO capability of the network.

Each device may indicate that the UE_A 10 is located in the area in which restriction is imposed on communication in MO mode, by transmitting and/or receiving the twenty-seventh identification information. Each device may indicate that the UE_A 10 is located in the area in which communication in MO mode is allowed, by transmitting and/or receiving the twenty-eighth identification information.

In a case that the UE_A 10 has received the tracking area update accept message, the UE_A 10 transmits a Tracking Area Update complete message to the CPF_A 140 via the NR node_A 122 (S1710). Each device completes the procedure (A) in the present procedure, based on transmission and/or reception of the tracking area update complete message.

Next, steps in the procedure (B) in the present procedure will be described. The CPF_A 140 transmits a Tracking Area Update reject message to the UE_A 10 via the NR node_A 122. The UE_A 10 receives the tracking area update reject message and recognizes that the request of the UE_A 10 has been rejected. Each device completes the procedure (B) in the present procedure, based on transmission and/or reception of the tracking area update reject message. The tracking area update reject message may include an appropriate reject cause. Note that the tracking area update reject message may be any response message to the tracking area update request message and may be, without being limited to the above, any message rejecting a request of tracking area update.

Each device completes the present procedure, based on completion of the procedure (A) or (B) in the present procedure.

Moreover, each device may perform processing based on identification information transmitted and/or received in the present procedure, based on completion of the present procedure. For example, in a case that the UE_A 10 has received the fifth identification information and the sixth identification information, the UE_A 10 sets the value indicated by the sixth identification information, in the first timer configured to count availability information of the fifth identification information, to further start counting by the first timer at the time of receiving an attach accept message or the time of transmitting an attach complete message. In a case that the first timer expires or a case that configuration of the UE_A 10 is updated by a configuration update procedure, the counting by the first timer is stopped. Details of the configuration update procedure will be described in Section 1.4.

In a case that the network has transmitted the fifth identification information and the sixth identification information, the network may appropriately configure a value in the second timer configured to count expiry of the fifth identification information in the network, to start the second timer. Alternatively, the network may appropriately configure and start the second timer, based on reception of an attach complete message from the UE_A 10. In a case that the second timer expires or a case that configuration of the network is updated by the configuration update procedure, the network stops the counting by the second timer. Details of the configuration update procedure will be described in Section 1.4.

In a case that the UE_A 10 has received the seventh identification information, the UE_A 10 does not establish a connection to a specified NSI while the UE_A 10 is located in the area indicated by the seventh identification information. For example, in a case that the UE_A 10 has received the eighth identification information, a specified NSI maintains an established connection while the UE_A 10 is located in the area indicated by the eighth identification information.

In a case that the UE_A 10 has received the ninth identification information, the UE_A 10 checks each TA list indicated by the ninth identification information and the location of the UE_A 10. In a case that the location of the UE_A 10 is not included in an area indicated by at least one TA list, the UE_A 10 may initiate the tracking area update procedure again.

In a case that the UE_A 10 has received the twenty-sixth identification information and also that the twenty-sixth identification information is information including information indicating that the network is incapable of communication in MO mode and/or information indicating that the network does not allow communication in MO mode, and/or the twenty-sixth identification information is information indicating the meaning of above information, the UE_A 10 performs, after establishment of a PDU session, communication in the normal mode, receives paging from the network, and performs a periodic tracking area update procedure.

In a case that the UE_A 10 has received the twenty-sixth identification information and also that the twenty-sixth identification information is information including information indicating that the network is capable of communication in MO mode and/or information indicating that the network allows communication in MO mode, or the twenty-sixth identification information is information indicating the meaning of above information, the UE_A 10 performs, after establishment of a PDU session, communication in MO mode, and stops receiving paging from the network and initiating the periodic tracking area update procedure.

After completion of the present procedure, the UE_A 10 may initiate the tracking area update procedure, based on the mode to which the UE_A 10 has changed. In other words, in a case that restriction has been imposed on MO mode through the present procedure, the UE_A 10 may initiate the tracking area update procedure to change to MO mode.

Note that the UE_A 10 may initiate the tracking area update procedure after completion of the present procedure, without being limited to the above. For example, the UE_A 10 may initiate the tracking area update procedure, based on expiry of the first timer.

The above-described first and/or third and/or fourth condition determination may be performed based on identification information included in the tracking area update request message and/or subscriber information and/or an operator policy, Conditions for determination of whether each of the first and/or third and/or fourth conditions is true or false may not necessarily be limited to the above-described conditions.

For example, the first condition and/or the third condition and/or the fourth condition may be true in a case that the UE_A 10 requests tracking area update and the network allows the request. The first condition and/or the third condition and/or the fourth condition may be false in a case that the UE_A 10 requests tracking area update and the network does not allow the request. Moreover, the first condition and/or the second condition and/or the third condition may be false in a case that a network that is a connection destination of the UE_A 10 and/or any device in the network does not support tracking area update requested by the UE_A 10.

1.4. Overview of Network initiated Configuration Update Procedure

An overview of the network initiated configuration update procedure will be described. Hereinafter, the present procedure indicates the network initiated configuration update procedure. The present procedure is a procedure to update an identifier(s) and/or a parameter(s) and/or a value of the first timer and/or a type(s) of mode and/or an accepted NSI(s) and/or a TA list(s) related to the network, in the UE_A 10. Also or alternatively, the present procedure is a procedure to report update of an identifier(s) and/or a parameter(s) and/or a value of the second timer and/or a type(s) of mode and/or an accepted NSI(s) and/or a TA list(s) associated with the UE_A 10, in the network.

In addition, the present procedure is a network initiated procedure. Note that the network and/or each device (e.g., the CPF_A 140) in the network may initiate the present procedure, based on a change of operator policy and/or subscriber information of the UE_A 10 and/or expiry of each timer and/or reception of a control message from the UE_A 10. The network and/or each device in the network is not limited to this and may be able to initiate the present procedure at an arbitrary timing as long as being in the first state.

1.4.1. Example of Configuration Update Procedure

Figure 2:
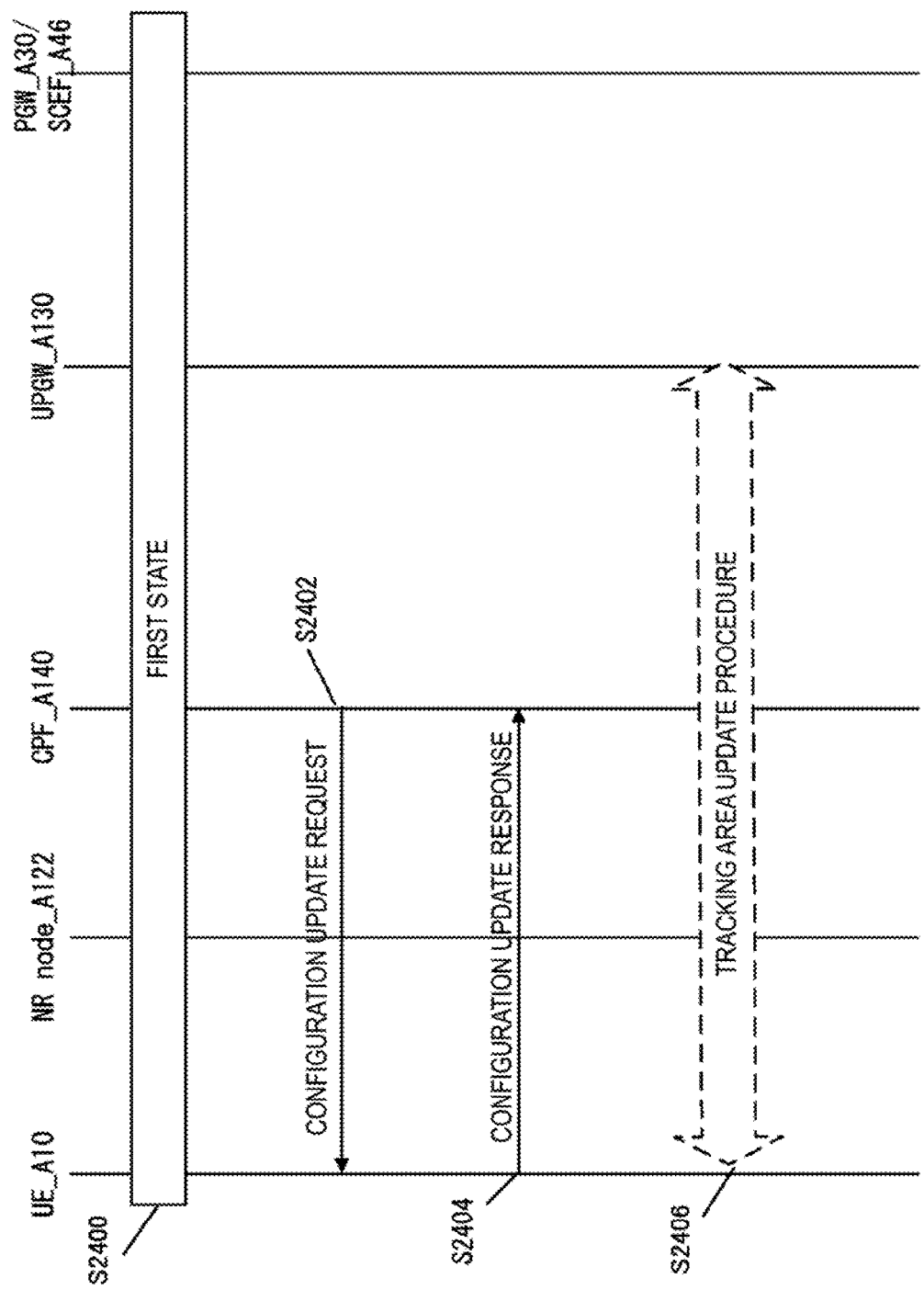
FIG. 2 is a diagram illustrating a network initiated configuration update procedure.

An example of steps of the configuration update procedure will be described using FIG. 2. Hereinafter, steps of the present procedure will be described. First, the CPF_A 140 transmits a configuration update request message to the UE_A 10 via the NR node_A 122 to initiate the configuration update procedure (S2402). Here, the configuration update request message may be a NAS message. By the CPF_A 140 transmitting the configuration update request message to the NR node_A 122 in the S1AP message and the NR node_A 122 transmitting the received configuration update request message to the UE_A 10 in the RRC message, the CPF_A 140 may thus transmit the configuration update request message to the UE_A 10 via the NR node_A 122.

Here, the CPF_A 140 may include at least one or more pieces of identification information of the thirtieth identification information to the thirty-eighth identification information in the configuration update request message and/or the S1AP message, or may indicate a request of the CPF_A 140 and/or the network by including these pieces of identification information in the message(s). The NR node_A 122 may include one or more of the thirtieth identification information to the thirty-eighth identification information in an RCC message, or may indicate the request of the CPF_A 140 and/or the network by including these pieces of identification information in the message.

Moreover, the CRT A 140 and/or the NR node_A 122 may indicate that an identifier(s) held by each device is to be updated or may indicate an identifier(s) after update, by transmitting the thirtieth identification information and/or the thirty-first identification information.

The CPF_A 140 and/or the NR node_A 122 may indicate that the value of the first timer is to be updated and/or that the first timer is started again, or may indicate the value of the first timer after update, by transmitting the thirty-second identification information.

The CPF_A 140 and/or the NR node_A 122 may indicate that a TA list(s) is to be updated or may indicate a TA list(s) after update, by transmitting the thirty-third identification information. Note that the CPF_A 140 may transmit or update the TA lists and NSIs in association with each other.

The CPF_A 140 and/or the NR node_A 122 may indicate that restriction is imposed on connection and/or establishment of a PDU session and/or establishment of a bearer of the UE_A 10 with a particular one(s) and/or part of the accepted NSIs, by transmitting the thirty-fourth identification information.

The CPF_A 140 and/or the NR node_A 122 may indicate that restriction is imposed on connection and/or establishment of a PDU session and/or establishment of a bearer of the UE_A 10 with all the accepted NSIs, by transmitting the thirty-fourth identification information.

The CPF_A 140 and/or the NR node_A 122 may indicate that there is an NSI(s) on which restriction is imposed, or may indicate that it is possible to obtain an NSI(s) on which restriction is imposed with reference to a TA list(s) and/or NSIs associated with the TA list(s), by transmitting the thirty-fourth identification information. The CPF_A 140 may indicate an NSI(s) on which restriction is imposed, by transmitting the thirty-fourth identification information.

The CPF_A 140 and/or the NR node_A 122 may indicate that connection and/or establishment of a PDU session and/or establishment of a bearer of the UE_A 10 with a particular one(s) and/or part of the accepted NSIs is allowed, by transmitting the thirty-fifth identification information.

The CPF_A 140 and/or the NR node_A 122 may indicate that connection and/or establishment of a PDU session and/or establishment of a bearer of the UE_A 10 with all the accepted NSIs is allowed, by transmitting the thirty-fifth identification information.

The CPF_A 140 and/or the NR node_A 122 may indicate that there is an allowed NSI(s), or may indicate that it is possible to obtain an allowed NSI(s) with reference to a TA list(s) and/or NSIs associated with the TA list(s), by transmitting the thirty-fifth identification information. The CPF_A 140 may indicate an allowed NSI(s) by transmitting the thirty-fifth identification information.

The CPF_A 140 and/or the NR node_A 122 may indicate that MO mode is not allowed or may indicate that the MO mode is not allowed in the current TA, by transmitting the thirty-sixth identification information. The CPF_A 140 may indicate that MO mode is allowed or may indicate that MO mode is allowed in the current TA, by transmitting the thirty-seventh identification information.

The CPF_A 140 and/or the NR node_A 122 may indicate that a change to MO mode is requested or may indicate a change from MO mode to another mode, such as the normal mode, by transmitting the thirty-eighth identification information. In other words, the CPF_A 140 may indicate a mode after a requested change, by transmitting the thirty-eighth identification information.

The UE_A 10 receives the configuration update request message and performs a tenth condition determination. In the tenth condition determination, the UE_A 10 determines whether a tenth condition is true or false. In a case that the tenth condition is true, the UE_A 10 initiates a procedure (A) in the present procedure; in a case that the tenth condition is false, the UE_A 10 initiates a procedure (B) in the present procedure. Note that steps in the case that the tenth condition is false will be described later.

Hereinafter, steps in the case that the tenth condition is true, specifically, steps in the procedure (A) in the present procedure, will be described. The UE_A 10 transmits a configuration update response message to the CPF_A 140 via the NR node_A 122 to initiate the procedure (A) in the present procedure (S2404).

Here, the UE_A 10 may include at least the thirty-ninth identification information in the configuration update response message, or may indicate that the UE_A 10 has accepted a request of the CPF_A 140 and/or the network, by including the identification information in the message.

The UE_A 10 may indicate that the UE_A 10 is to change to a mode identified by the thirty-ninth identification information, or may notify the network of the mode to which the UE_A 10 is to change, by transmitting the thirty-ninth identification information. Note that the mode identified by the thirty-ninth identification information may be the same as or different from the mode identified by the thirty-eighth identification information.

The CPF_A 140 receives the configuration update response message and completes the procedure (A) in the present procedure. Next, steps in the procedure (B) in the present procedure will be described. The UE_A 10 transmits a configuration update reject message to the CPF_A 140 via the NR node_A 122 to initiate the procedure (B) in the present procedure (S2404). The CPF_A 140 receives the configuration update reject message and completes the procedure (B) in the present procedure.

Here, the UE_A 10 may include at least information indicating a reason for rejecting a request of the network, in the configuration update reject message, or may indicate that the UE_A 10 has rejected a request of the CPF_A 140 and/or the network, by including the information in the message.

Each device completes the present procedure, based on completion of the procedure (A) or (B) in the present procedure. Moreover, each device may perform processing based on identification information transmitted and/or received in the present procedure, based on completion of the present procedure.

For example, in a case that each device has transmitted and/or received the thirtieth identification information and/or the thirty-first identification information, an identifier(s) and/or a parameter(s) held by each device may be updated or newly stored. Each device may change a value of a timer started by the device or may further set the thirty-second identification information in the timer to start the timer again, by transmitting and/or receiving the thirty-second identification information.

Each device may update or newly store a TA list(s) held by each device, by transmitting and/or receiving the thirty-third identification information. Each device may store the TA list and an NSI(s) in an association with each other.

Each device may update or newly store information indicating an accepted NSI(s) held by the device, by transmitting and/or receiving the thirty-fourth identification and/or the thirty-fifth identification information. Each device may change to a mode identified by the thirty-ninth identification information by transmitting and/or receiving the thirty-ninth identification information.

After completion of the present procedure, the UE_A 10 may initiate the tracking area update procedure, based on the mode to which the UE_A 10 has changed. In other words, in a case that restriction has been imposed on MO mode in the present procedure, the UE_A 10 may initiate the tracking area update procedure to change to MO mode (S2406).

Note that the UE_A 10 may initiate the tracking area update procedure after completion of the present procedure, without being limited to the above. For example, the UE_A 10 may initiate the tracking area update procedure, based on expiry of the first timer.

2. Modifications

A program running on an apparatus according to the present invention may serve as a program that controls a Central Processing Unit (CPU) and the like to cause a computer to operate in such a manner as to realize the functions of the embodiment according to the present invention. Programs or the information handled by the programs are temporarily stored in a volatile memory, such as a Random Access Memory (RAM), a non-volatile memory, such as a flash memory, a Hard Disk Drive (HDD), or another storage device system.

Note that a program for implementing functions of the embodiment according to the present invention may be recorded on a computer-readable recording medium. The functions may be implemented by causing a computer system to read and execute the program recorded on the recording medium. It is assumed that the "computer system" refers to a computer system built into the apparatuses, and the computer system includes an operating system and hardware components such as a peripheral device. Furthermore, the "computer-readable recording medium" may be a semiconductor recording medium, an optical recording medium, a magnetic recording medium, a medium configured to dynamically hold a program for a short period of time, or another computer-readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuits may be constituted of a digital circuit or may be constituted of an analog circuit. Furthermore, in a case that with advances in semiconductor technology, a circuit integration technology appears that replaces the present integrated circuits, it is also possible for one or multiple aspects of the present invention to use a new integrated circuit based on the technology.

Note that the invention of the present patent application is not limited to the above-described embodiment. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements described in the respective embodi-

REFERENCE SIGNS LIST

1 Mobile communication system
5 PDN_A
10 UE_A
30 PGW_A
35 SGW_A
40 MME_A
42 SGSN_A
45 eNB_A
46 SCEF_A
50 HSS_A
60 PCRF_A
80 E-UTRAN_A
120 NextGen RAN_A
122 NR node_A
125 WLAN ANc
126 WAG_A
130 UPGW_A
140 CPF_A
190 Core network_B

The invention claimed is:

1. A User Equipment (UE) comprising:
transmission and reception circuitry, wherein
the transmission and reception circuitry is configured for:
receiving an accept message for registration including first identification information and second identification information from a core network; and
transmitting the first identification information together with a Protocol Data Unit (PDU) session establishment request message in a PDU session establishment procedure,
wherein
the first identification information is identification information identifying a network slice allowed by the core network,
the first identification information is identification information included in a Network Slice Selection Assistance Information (NSSAI),
the second identification information is identification information identifying a network slice not allowed by the core network,
the second identification information is identification information included in the NSSAI,
the NSSAI is included in a request message for registration sent by the UE to the core network, and
the NSSAI includes one or more identification information identifying network slices requested by the UE.

2. The UE according to claim 1, wherein
the transmission and reception circuitry is further configured for receiving one or more identification information identifying network slices allowed by the core network together with the first identification information.

3. The UE according to claim 1, wherein
the transmission and reception circuitry is further configured for receiving one or more identification information identifying network slices not allowed by the core network together with the second identification information.

4. A core network device comprising:
transmission and reception circuitry, wherein
the transmission and reception circuitry is configured for:
transmitting an accept message for registration including first identification information and second identification information to a User Equipment (UE), and
receiving, from the UE, the first identification information together with a Protocol Data Unit (PDU) session establishment request message in a PDU session establishment procedure,
wherein
the first identification information is identification information identifying a network slice allowed by a core network,
the first identification information is identification information included in a Network Slice Selection Assistance Information (NSSAI),
the second identification information is identification information identifying a network slice not allowed by the core network,
the second identification information is identification information included in the NSSAI,
the NSSAI is included in a request message for registration sent by the UE to the core network, and
the NSSAI includes one or more identification information identifying network slices requested by the UE.

5. The core network device according to claim 4, wherein
the transmission and reception circuitry is further configured for transmitting one or more identification information identifying network slices allowed by the core network together with the first identification information.

6. The core network device according to claim 4, wherein
the transmission and reception circuitry is further configured for transmitting one or more identification information identifying network slices not allowed by the core network together with the second identification information.

7. The core network device according to claim 4, the core network device further comprising:
control circuitry configured for performing mobility management of the UE.

8. A communication control method performed by a User Equipment (UE), the communication control method comprising:
receiving an accept message for registration including first identification information and second identification information from a core network; and
transmitting the first identification information together with a Protocol Data Unit (PDU) session establishment request message in a PDU session establishment procedure,
wherein
the first identification information is identification information identifying a network slice allowed by the core network,
the first identification information is identification information included in a Network Slice Selection Assistance Information (NSSAI),
the second identification information is identification information identifying a network slice not allowed by the core network,
the second identification information is identification information included in the NSSAI, the NSSAI is included in a request message for registration sent by the UE to the core network, and the NSSAI includes one or more identification information identifying network slices requested by the UE.

9. The communication control method according to claim 8, the communication control method further comprising:

receiving one or more identification information identifying network slices allowed by the core network together with the first identification information.

10. The communication control method according to claim 8, the communication control method further comprising:

receiving one or more identification information identifying network slices not allowed by the core network together with the second identification information.

11. A communication control method performed by a core network device, the communication control method comprising:

transmitting an accept message for registration including first identification information and second identification information to a User Equipment (UE), and receiving, from the UE, the first identification information together with a Protocol Data Unit (PDU) session establishment request message in a PDU session establishment procedure, wherein the first identification information is identification information identifying a network slice allowed by a core network, the first identification information is identification information included in a Network Slice Selection Assistance Information (NSSAI), the second identification information is identification information identifying a network slice not allowed by the core network, the second identification information is identification information included in the NSSAI, the NSSAI is included in a request message for registration sent by the UE to the core network, and the NSSAI includes one or more identification information identifying network slices requested by the UE.

12. The communication control method according to claim 11, the communication control method further comprising:

transmitting one or more identification information identifying network slices allowed by the core network together with the first identification information.

13. The communication control method according to claim 11, the communication control method further comprising:

transmitting one or more identification information identifying network slices not allowed by the core network together with the second identification information.

14. The communication control method according to claim 11, the communication control method further comprising:

performing mobility management of the UE.

* * * * *